(12) United States Patent
Müller et al.

(10) Patent No.: US 10,358,526 B2
(45) Date of Patent: Jul. 23, 2019

(54) MOISTURE-CURING POLYETHER CARBONATE CONTAINING ALKOXYSILYL GROUPS

(71) Applicant: Covestro Deutschland AG, Leverkusen (DE)

(72) Inventors: Thomas Ernst Müller, Aachen (DE); Christoph Gürtler, Köln (DE); Muhammad Afzal Subhani, Aachen (DE); Burkhard Koehler, Zierenberg (DE)

(73) Assignee: Covestro Deutschland AG, Leverkusen (DE)

( * ) Notice: Subject to any disclaimer, the term of this patent is extended or adjusted under 35 U.S.C. 154(b) by 15 days.

(21) Appl. No.: 15/511,664

(22) PCT Filed: Sep. 21, 2015

(86) PCT No.: PCT/EP2015/071556
§ 371 (c)(1),
(2) Date: Mar. 16, 2017

(87) PCT Pub. No.: WO2016/046110
PCT Pub. Date: Mar. 31, 2016

(65) Prior Publication Data
US 2017/0313816 A1  Nov. 2, 2017

(30) Foreign Application Priority Data

Sep. 23, 2014 (EP) .................... 14185896

(51) Int. Cl.
| C08G 64/18 | (2006.01) |
| C08G 18/50 | (2006.01) |
| C08G 64/02 | (2006.01) |
| C08G 64/34 | (2006.01) |
| C08G 64/42 | (2006.01) |
| C08F 4/06 | (2006.01) |
| C09J 175/08 | (2006.01) |
| C09D 175/08 | (2006.01) |

(52) U.S. Cl.
CPC .............. *C08G 64/183* (2013.01); *C08F 4/06* (2013.01); *C08G 18/5096* (2013.01); *C08G 64/0266* (2013.01); *C08G 64/186* (2013.01); *C08G 64/34* (2013.01); *C08G 64/42* (2013.01); *C09D 175/08* (2013.01); *C09J 175/08* (2013.01); *C08G 2190/00* (2013.01)

(58) Field of Classification Search
CPC ........ C08G 65/22; C08G 64/30; C08L 101/10
See application file for complete search history.

(56) References Cited

U.S. PATENT DOCUMENTS

| 3,404,109 A | 10/1968 | Milgrom |
| 3,829,505 A | 8/1974 | Herold |
| 3,941,849 A | 3/1976 | Herold |
| 5,158,922 A | 10/1992 | Hinney et al. |
| 5,470,813 A | 11/1995 | Le-Khac |
| 5,536,883 A | 7/1996 | Le-Khac |
| 5,637,673 A | 6/1997 | Le-Khac |
| 5,714,428 A | 2/1998 | Le-Khac |
| 5,789,626 A | 8/1998 | Le-Khac |
| 6,018,017 A | 1/2000 | Le-Khac |
| 6,100,367 A | 8/2000 | Kobayashi et al. |
| 6,780,813 B1 | 8/2004 | Hofmann et al. |
| 6,835,687 B2 | 12/2004 | Hofmann et al. |
| 7,008,900 B1 | 3/2006 | Hofmann et al. |
| 8,450,514 B2 | 5/2013 | Schubert et al. |
| 9,458,286 B2 | 10/2016 | Zander et al. |
| 2014/0256908 A1* | 9/2014 | Hofmann ............. C08G 64/183 528/405 |
| 2015/0284499 A1 | 10/2015 | Köcher et al. |

FOREIGN PATENT DOCUMENTS

| DE | 102009042201 A1 | 4/2011 |
| DE | 102011076687 A1 | 12/2012 |
| JP | 04145123 A | 5/1992 |
| WO | WO 2013 010986 | * 1/2013 |

OTHER PUBLICATIONS

Srna, Von Christian; Angewandte MakromolekulareChemie 9; Sep. 4, 1969; "Beitrag zur Kenntnis der Polymerisationsanregung mit Redoxsystemen, die Metallverbindungen enthalten"; pp. 165-181; Ludwigshafen am Rhein.
Lewis, Lany N. et al; Platinum Metals Review; "Platinum Catalysts Used in the Silicones Industry Their Synthesis and Activity in Hydrosilylation"; (1997); 41(2); pp. 66-75; Schenectady, New York.
Bevington, John C.; Makromolekular Chemie; Macromolecular Symposia; "Initiation of Polymerization: AZO Compounds and Peroxides"; (1987); 10/11; pp. 89-107; Department of Chemistry, The University, Lancaster, U.K.
Eckstorff, Felix et al; Polymer 52 (2011); "Materials with tunable low-k dielectric constant derived from functionalized octahedral silsesquioxanes and spherosilicates"; pp. 2492-2498.

(Continued)

*Primary Examiner* — Kuo Liang Peng
(74) *Attorney, Agent, or Firm* — Denise Brown

(57) ABSTRACT

The present invention relates to a method for producing polyether carbonates containing alkoxysilyl groups in which (a) an unsaturated polyether carbonate polyol is reacted with (b) an alkoxysilane compound of formula (II) $Si(X)_m(R1)_n(R2)_o$ (II), where X=H, Y—S—H and Y=C1-C22 alkylene, C6-C14 arylene, C7-C14 aralkylene, C7-C14 alkylarylene; R1=C1-C8 alkoxy, C7-C20-aralkoxy, C6-C14 aroxy, C7-C20 alkylaroxy; R2=C1-C22 alkyl, C6-C14 aryl, C7-C14 aralkyl, C7-C14 alkylaryl, and m and n represent, independently of one another, an integer ≥1, o is zero or an integer ≥1 and m+n+o=4. The invention further relates to the production of a polyurethane polymer using such a polyether carbonate, a cross-linked, siloxane group containing polymer and a molded part containing or consisting of said cross-linked polymer.

15 Claims, No Drawings

(56) References Cited

OTHER PUBLICATIONS

Fouassier, Jean Pierre et al: Photochemistry and Photophysics of Polymer Materials; "Photoinitiators for Free Radical Polymerization Reactions"; (2010); pp. 351-419.

Inoue, Shohei et al; Die Makromolekulare Chemie 130; (1969); "Copolymerization of Carbon Dioxide and Epoxide with Organometallic Compounds"; pp. 210-220 (Nr. 3170); Tokyo, Japan.

Zhang, Jiang-Feng et al; "Fully Degradable and Well-Defined Brush Copolymers from Combination of Living CO2/Epoxide Copolymerization, Thiol-Ene Click Reaction and ROP of ε-caprolactone"; (2011); American Chemical Society; ACS Publications; pp. 9882-9886; Dalian 116012, China.

Kember, Michael R. et al; "Catalysts for CO2/epoxide copolymerisation"; ChemComm; The Royal Society of Chemistry 2011; 47; pp. 141-163.

Wuts, P. G. M. et al; "The Role of Protective Groups in Organic Synthesis" in Greene's Protective Groups in Organic Synthesis, Fourth Edition, John Wiley & Sons, Inc., Hoboken, NJ, USA.

Myers, T. N.; Kirk-Othmer Encyclopedia of Chemical Technology; (2001); Initiators, Free-Radical; Copyright by John Wiley & Sons, Inc.

Misra, G. S. et al; Prog. Polym. Sci.; "Redox Polymerization"; vol. 8; pp. 61-131; (1982); Pergamon Press Ltd.; Great Britain.

\* cited by examiner

MOISTURE-CURING POLYETHER CARBONATE CONTAINING ALKOXYSILYL GROUPS

CROSS-REFERENCE TO RELATED APPLICATIONS

This Application is a National Phase Application of PCT/EP2015/071556, filed Sep. 21, 2015, which claims priority to European Application No. 14185896.9 filed Sep. 23, 2014, each of which being incorporated herein by reference.

FIELD

The present invention relates to a process for preparing polyether carbonates containing alkoxysilyl groups, to the preparation of a polyurethane polymer using such a polyether carbonate, to a crosslinked polymer containing siloxane groups, and to a shaped body comprising or consisting of such a crosslinked polymer.

BACKGROUND

As well as having a tailored functionality, modern plastics are also intended to do increased justice to environmental concerns. As well as by a general optimization of preparation processes, this can also be achieved through the use of greenhouse gases, such as carbon dioxide, as building blocks for the synthesis of polymers. Accordingly, for example, a better environmental balance for the process can be obtained overall via the fixing of carbon dioxide. This path is being followed in the area of the production of polyether carbonates, and has been a topic of intense research for more than 40 years (e.g., Inoue et al, Copolymerization of Carbon Dioxide and Alkylenoxide with Organometallic Compounds; Die Makromolekulare Chemie 130, 210-220, 1969). In one possible preparation variant, polyether carbonates are obtained by a catalytic reaction of epoxides and carbon dioxide in the presence of H-functional starter compounds ("starters"). A general reaction equation for this is given in scheme (I):

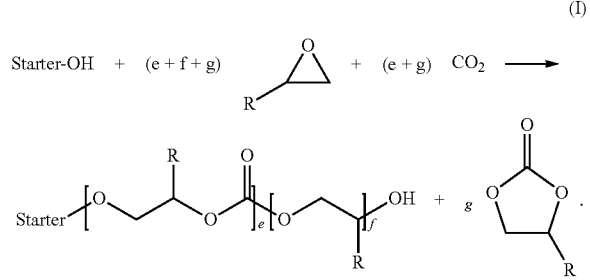

A further product, in this case an unwanted by-product, arising alongside the polyether carbonate is a cyclic carbonate (for example, for R=CH$_3$, propylene carbonate).

In order to make specifically functionalized polyether carbonates amenable to paint, thermoset or elastomer chemistry, the introduction of reactive, especially crosslinkable groups in the polymer skeleton is desirable. Alkoxysilyl groups are particularly favorable in this context, since they are crosslinkable under the influence of moisture.

In the literature, for example, Macromolecules (2011) 44, 9882-9886 describes the addition of mercaptoethanol onto polyether carbonates containing vinylcyclohexene oxide as comonomer (thiol-ene click chemistry). This reaction has been utilized to provide polyether carbonates with lateral hydroxyl group functionalization. The introduction of other functional groups by this reaction is not mentioned.

WO 2012136657 A1 describes a process for copolymerization of carbon dioxide and at least one epoxide in the presence of at least one double metal cyanide catalyst (DMC catalyst), wherein the epoxide(s) intended for polymerization are contacted with carbon dioxide in a pressure vessel at a temperature of 0 to 40° C. until a constant temperature is established, the pressure of the carbon dioxide supplied being in the range from 1 to 500 bar, and then the copolymerization of the mixture thus obtained is commenced. The preparation of polyether carbonates containing alkoxysilyl groups by copolymerization of CO$_2$, epoxides and epoxides containing alkoxysilyl groups is likewise mentioned, but the monomer containing alkoxysilyl groups is utilized as reactive additive in order to increase the incorporation rate of CO$_2$ into the polymer. No crosslinking of the resulting polyether carbonates is described. This procedure is in some cases regarded as disadvantageous because the crosslinking-active alkoxysilyl group is already present during the preparation of the polyether carbonate, as a result of which there is a risk of crosslinking of the polymer even during the synthesis or workup. More particularly, at the high polymerization temperatures, the OH end groups of the OH-functional starter compounds or of the polymer formed can react with the alkyl-O—Si or aryl-O—Si units under transetherification.

EP 2 725 044 A1 describes an alkoxysilane-terminated prepolymer and the process for preparing this prepolymer, by the reaction of polyols with polyisocyanates and an alkoxysilane. In this case, the polymer is obtained in the 1st process stage by initial addition of CO$_2$ and alkylene oxides onto H-functional starter compounds. This is followed by the reaction with polyisocyanates to give polyurethane prepolymers, which are finally reacted with alkoxysilanes having at least one isocyanate and/or isocyanate-reactive group. The examples relate to the reaction of a polyether carbonate diol with hexamethylene diisocyanate, which is reacted with [(cyclohexylamino)methyl]triethoxysilane in a further step. The resulting functionalized prepolymer is terminated here by exactly two alkoxysilane groups, which results in a high distance between crosslinking points in the subsequent reaction with glycerol or carboxymethyl cellulose. The NCO content of the prepolymers (1.82% to 3.7%) results in a proportion of triethoxysilane groups of 6.5 to 12.1 wt % in the resulting alkoxysilane-terminated prepolymer. For many applications, it would be desirable to be able to adjust the proportion of alkoxysilane groups in the introduction of the alkoxysilane groups.

EP 2 093 244 A1 discloses a process for preparing polyether alcohols bearing alkoxysilyl groups and the resulting polyether alcohols. This involves a DMC-catalyzed reaction of propylene oxide onto monools in the presence of oxyalkylenesilane-containing epoxides, for example 3-glycidyloxypropyltrimethoxysilane (GLYEO). The resulting monoalcohols are characterized by a block copolymer structure consisting of a GLYEO-containing block and a propylene glycol block. Because of the simultaneous presence of alcohol groups and alkoxysilyl groups, the polymer obtained is not storage-stable and crosslinks within a short time. Example 3 describes the use of carbon dioxide as comonomer, but only a low carbonate content of about 4 wt % is achieved.

U.S. Pat. No. 6,100,367 describes a process for preparing a modified polymer by reaction of an unsaturated polycarbonate with an alkoxysilane in the presence of a hydrosilylation catalyst. The use of polyether carbonate polyols as unsaturated polycarbonate is not described.

SUMMARY

It was an object of the present invention to provide a process for preparing polyether carbonates containing alkoxysilyl groups, which permits subsequent functionalization of the polyether carbonates, in order to make them amenable, for example, subsequently to a controllable crosslinking reaction.

This object is achieved in accordance with the invention by a process for preparing polyether carbonates containing alkoxysilyl groups, in which
(a) an unsaturated polyether carbonate polyol is reacted with
(b) an alkoxysilane compound of the formula (II)

$$Si(X)_m(R1)_n(R2)_o \quad (II)$$

where
X=H, Y—S—H and Y=C1-C22 alkylene, C6-C14 arylene, C7-C14 aralkylene, C7-C14 alkylarylene; R1=C1-C8-alkoxy, C7-C20-aralkoxy, C6-C14-aroxy, C7-C20-alkylaroxy; R2=C1-C22 alkyl, C6-C14 aryl, C7-C14 aralkyl, C7-C14 alkylaryl and m and n are independently an integer ≥1, o is zero or an integer ≥1 and m+n+o=4.

DETAILED DESCRIPTION

The inventive addition of an alkoxysilane compound to a polyether carbonate that has already been functionalized with at least one double bond enables an efficient and selective process regime. By contrast with in situ incorporation of compounds containing alkoxysilyl groups by polymerization in the course of the terpolymerization for preparation of the polyether carbonate, for example by the addition of epoxy-functional silanes, the process of the invention allows much better control of the stoichiometric composition and the structure of the polymer. Thus, the synthesis regime of the invention avoids the risk of premature crosslinking of the polymer during the synthesis or workup. More particularly, at the high polymerization temperatures, it would otherwise be possible to react the OH end groups of the OH-functional starter compounds or of the polymer formed with the alkoxysilyl groups under transetherification. Furthermore, the use of epoxy-functional silanes, which is absolutely necessary in the prior art, can affect the reaction rates and/or the amount of $CO_2$ incorporated in a manner which is undesirable for the intended application of the polymers. The inventive synthesis regime with downstream alkoxysilane functionalization, by contrast, leads to a much greater number of degrees of process freedom.

The present invention is elucidated in detail hereinafter in connection with individual embodiments and further aspects. They may be combined arbitrarily with one another, unless the opposite is clearly apparent from the context.

In one configuration of the process of the invention, the unsaturated polyether carbonate polyol is prepared by first initially charging an H-functional starter compound and a catalyst and then reacting with carbon dioxide, at least one alkylene oxide and at least one unsaturated comonomer selected from the group of the unsaturated alkylene oxides and unsaturated cyclic anhydrides of organic acids. In other words, this process step can precede the process of the invention, in order to produce the unsaturated polyether carbonate polyol. The process of the invention is thus not limited to this way of producing the unsaturated polyether carbonate polyol.

In the context of the synthesis of the unsaturated polyether carbonate polyol as catalyst, it is possible to use, for example, a double metal cyanide catalyst. Catalysts of this type and the preparation thereof are described in detail hereinafter.

In the production of the unsaturated polyether carbonate polyol, the proportion of unsaturated comonomers may, for example, be ≥0.1 to ≤50 mol % based on the total molar amount of carbon dioxide, alkylene oxide and comonomers, especially ≥0.2 to ≤40 mol % and most preferably ≥0.5 to ≤15 mol %.

In a preferred configuration of the process of the invention, in the alkoxysilane compound of the formula (II), m=1. This is particularly advantageous because, as a result, the alkoxysilane compound bears essentially one group reactive toward the double bonds of the unsaturated polyether carbonate polyol and hence chain extension or even crosslinking of the unsaturated polyether carbonate polyol during this reaction of alkoxysilane functionalization can be substantially prevented.

Within the process of the invention, it may further be the case that, in the reaction of the unsaturated polyether carbonate polyol with the alkoxysilane compound of the formula (II) in which X=Y—S—H, a compound selected from the group of the photoinitiators, peroxides, azo compounds, metal-activated peroxides and/or redox initiators is added.

In an alternative preferred configuration of the process of the invention, it may further be the case that, in the reaction of the unsaturated polyether carbonate polyol with the alkoxysilane compound of the formula (II) in which X=H, a hydrosilylation catalyst from the group of the Karstedt or Speier catalysts, elemental platinum, elemental platinum on a support composed of activated carbon or alumina, or mixtures thereof is added.

In a preferred embodiment of the process of the invention, the OH groups of the unsaturated polyether carbonate polyol, prior to the reaction of the unsaturated polyether carbonate polyol with the alkoxysilane compound of the formula (II), are reacted with a protecting reagent to introduce protecting groups, the protecting reagent especially being selected from the group comprising trimethyloxonium tetrafluoroborate, methyl mesylate, methyl tosylate, dimethyl sulfate, methyl triflate, diazomethane, acetic anhydride, chloroacetyl anhydride, trifluoroacetyl anhydride, N,O-bis(trimethylsilyl)acetamide, hexamethyldisilazane in an equimolar mixture with chlorotrimethylsilane or with chlorotrimethylsilane in a molar excess, chlorotrimethylsilane, trimethylsilyl triflate, trityl chloride, o-nitrobenzyl chloride, tosyl chloride, mesyl chloride, tetrahydropyran and isobutene. This is advantageous because, in this way, the OH functionality of the unsaturated polyether carbonate polyol can be obtained in part or even in full with quantitative reaction of the OH groups with the protecting reagent in that the protecting reagent prevents any reaction of the OH groups with the alkoxysilane compound of the formula (II). The use of hexamethyldisilazane in a mixture with chlorotrimethylsilane is particularly reactive and therefore preferred. Hexamethyldisilazane is used with an at least equimolar amount of chlorotrimethylsilane, in order that no ammonia is eliminated as leaving group, which could destroy the polymer. By contrast, the ammonium chloride which forms in an equimolar use amount or the hydrogen chloride additionally released in the case of an excess of chlorotrimethylsilane is harmless to the polymer.

After the reaction of the unsaturated polyether carbonate polyol with the alkoxysilane compound of the formula (II), the protecting group can optionally be partly or fully removed again to obtain a polyether carbonate polyol containing alkoxysilyl groups.

The present invention further relates to a process for preparing a polyurethane polymer containing alkoxysilyl groups, wherein the process is characterized in that a polyether carbonate polyol containing alkoxysilyl groups preparable according to the present invention is reacted with a polyisocyanate compound, the amount of polyisocyanate compound used especially being chosen in such a way that the molar ratio of isocyanate groups thereof to the hydroxyl groups of the polyether carbonate polyol containing alkoxysilyl groups is less than 1:1. Preferably, the amount of polyisocyanate compound used is chosen such that the molar ratio of the isocyanate groups thereof to the hydroxyl groups of the polyether carbonate polyol containing alkoxysilyl groups is 0.9:1 or less, further preferably 0.85:1 or less.

The present invention further relates to a polyether carbonate containing alkoxysilyl groups or to a polyether carbonate polyol containing alkoxysilyl groups, obtainable by a process of the invention.

The present invention further relates to a polyurethane polymer containing alkoxysilyl groups, obtainable by a process of the invention.

In the process of the invention, moreover,
the polyether carbonate containing alkoxysilyl groups,
the polyether carbonate polyol containing alkoxysilyl groups,
a mixture of polyether carbonate containing alkoxysilyl groups and polyether carbonate polyol containing alkoxysilyl groups or
the polyurethane polymer containing alkoxysilyl groups can be crosslinked, especially by addition of water.

The present invention further relates to a crosslinked polymer containing siloxane groups, obtainable by a process as detailed above.

The invention further relates to the use of a polyether carbonate containing alkoxysilyl groups, a polyether carbonate polyol containing alkoxysilyl groups or a polyurethane polymer containing alkoxysilyl groups according to the present invention as adhesion promoter, filler-activator or in adhesives and sealants, wherein the adhesion promoter, the filler-activator and the adhesive and sealant especially comprises silica fillers.

The invention further relates to the use of a polyether carbonate containing alkoxysilyl groups or a polyether carbonate polyol containing alkoxysilyl groups according to the present invention as adhesion promoter, filler-activator or in adhesives and sealants, wherein the adhesion promoter, the filler-activator and the adhesive and sealant especially comprises silica fillers.

The invention further relates to the use of a polyurethane polymer containing alkoxysilyl groups according to the present invention as adhesion promoter, filler-activator or in adhesives and sealants, wherein the adhesion promoter, the filler-activator and the adhesive and sealant especially comprises silica fillers.

The present invention further relates to the use of a crosslinked polymer containing siloxane groups according to the present invention as coating composition, foam, sealing compound, thermoplastic polymer, thermoset polymer or elastomer, wherein the coating, foam, sealing compound, thermoplastic polymer, thermoset polymer or elastomer especially comprises silica fillers.

The invention additionally relates to a shaped body comprising or consisting of a crosslinked polymer containing siloxane groups according to the present invention.

The aforementioned embodiments and subjects are also further described on the basis of further embodiments. These may be combined arbitrarily with one another, unless the opposite is clearly apparent from the context.

Preferably, prior to the reaction of the unsaturated groups with alkoxysilane compounds, the terminal OH groups of the polyether carbonates are converted to a chemical group that does not react with Si—O-alkyl, Si—O-aralkyl, Si—O-aryl or Si—O-alkylaryl groups. The methods commonly used for the purpose are known to those skilled in the art. For example, this can be effected by reaction of the OH groups with trialkylsilyl derivatives, dialkylvinylsilyl derivatives, alkyldivinylsilyl derivatives or triarylsilyl derivatives, with detachment of the leaving group. Suitable trialkylsilyl derivatives are N,O-trialkylsilylacetamide, trialkylsilyl chloride, trialkylsilyl bromide, hexaalkyldisilazanes in a mixture with trialkylsilyl halides, bis(trialkylsilyl)urea, N-trialkylsilyl-N-methyltrifluoroacetamide, trialkylsilyl triflate, trialkylsilylimidazole or bistrialkylsilyltrifluoroacetamide. Instead of the trialkylsilyl derivatives, it is also possible to use alkyl-, vinyl- and arylsilyl derivatives that are mixed or pure with regard to the radicals on the silicon atom. An alternative method is the reaction of the OH groups with alkylating reagents, for example trimethyloxonium salts, methyl halides, methyl sulfonates, such as methyl mesylate, methyl tosylate, methyl triflate, dimethyl sulfate, diazomethane, benzyl chloride, o-nitrobenzyl chloride, benzyl mesylate, benzyl tosylate and phenyldiazomethane. A further method is the reaction of the OH groups with acylating reagents, for example carboxylic anhydrides, such as acetic anhydride, trichloroacetic anhydride, trifluoroacetic anhydride or benzoic anhydride, carbonyl halides, such as acetyl chloride, chloroacetyl chloride, trichloroacetyl chloride or trifluoroacetyl chloride, carbonic monoester halides, such as benzyl chloroformate, or carbonic monoester anhydrides, such as di-tert-butyl dicarbonate (BOC anhydride). A further method is the reaction of the OH groups with sulfonic acid derivatives, such as mesyl chloride, tosyl chloride, trifluoromethanesulfonyl chloride, trifluoromethanesulfonic anhydride or benzene sulfochloride.

In a preferred embodiment, the OH groups of the polyether carbonate polyol having unsaturated groups, prior to the reaction of the unsaturated polyether carbonate polyol with the alkoxysilane compound of the formula (II), are reacted with a protecting reagent to introduce protecting groups, the protecting reagent being selected from the group comprising NO-bis(trimethylsilyl)pacetamide (BSA), chlorotrimethylsilane, 1,1,1,3,3,3-hexamethyldisilazane (HMDS); mixtures of chlorotrimethylsilane and hexamethyldisilazane, bromotrimethylsilane, trimethylsilyl triflate, N,N-bis(trimethylsilyl)urea, N,O-bis(trimethylsilyl)trifluoroacetamide (BSFA), trimethyloxonium salts, methyl sulfonate, methyl sulfate, acetic anhydride, chloroacetic anhydride, trifluoroacetic anhydride, trityl chloride, o-nitrobenzyl chloride, tosyl chloride, mesyl chloride, tetrahydropyran, isobutene.

Suitable protecting groups for OH groups and reagents for introduction thereof are described in the book Peter G. M. Wuts, Theodora W. Greene, Greene's Protective Groups in ORGANIC SYNTHESIS, 4th Edition, Wiley (2006). They can be used to protect the terminal OH group of the polyether carbonates containing unsaturated groups prior to reaction with alkoxysilane compounds.

The polyether carbonates having unsaturated groups usable in accordance with the invention, after the reaction of the terminal OH groups and before the reaction with alkoxysilane compounds of the formula (II), preferably have an OH functionality (i.e. average number of OH groups per molecule) of <0.8, preferably of <0.1. In an alternative embodiment, the terminal OH groups of the polyether carbonates are not converted to another chemical group. Such polyether carbonates having unsaturated groups preferably have an OH functionality of 1 to 8, more preferably of 1 to 6 and most preferably of 2 to 4. In an alternative embodiment, the terminal OH groups of the polyether carbonates having unsaturated groups, prior to the reaction with alkoxysilane compounds of the formula (II), are not converted to another chemical group. Such polyether carbonates having unsaturated groups preferably have an OH functionality of 1 to 8, more preferably of 1 to 6 and most preferably of 2 to 4.

In an alternative embodiment, after the reaction of the unsaturated polyether carbonate polyol with the alkoxysilane compound of the formula (II), the protecting group is removed again to obtain a polyether carbonate polyol having alkoxysilyl groups. The methods commonly used for the purpose are known to those skilled in the art. This can enable further reaction opportunities on the OH groups of the polyether carbonates after removal of the protecting group. For example, the OH groups can be reacted with isocyanate groups.

A preferred embodiment of the invention includes the use of polyether carbonates having electron-rich double bonds, which means double bonds substituted by +M or +I substituents such as aryl, alkyl or alkoxyalkyl or cycloalkyl groups. In general, electron-rich double bonds in the context of the invention are those that are electron-richer than ethylene. Particular preference is given to allyl ethers or vinyl compounds.

These double bonds can be introduced into the base skeleton of the polyether carbonates through the use of epoxides having double bonds as comonomer in the copolymerization of epoxides with $CO_2$. Epoxides usable in the context of the invention are, for example, allyl glycidyl ether, 1,2-epoxy-3-vinylcyclohexane, 1,2-epoxy-4-vinylcyclohexane, butadiene monoepoxide, isoprene monoepoxide or limonene oxide, preference being given to allyl glycidyl ether.

Electron-rich double bonds can also be introduced into the polyether carbonate via cyclic anhydrides having electron-rich double bonds, such as 4-cyclohexene-1,2-dicarboxylic anhydride, 4-methyl-4-cyclohexene-1,2-dicarboxylic anhydride, norbornenedioic anhydride, allylnorbornenedioic anhydride, dodecenylsuccinic anhydride, tetradecenylsuccinic anhydride, hexadecenylsuccinic anhydride or octadecenylsuccinic anhydride, where the double bond in the alkenylsuccinic anhydrides is not an exo double bond on the ring.

An alternative embodiment includes the use of polyether carbonates having electron-deficient double bonds, which means double bonds substituted by −M or −I substituents such as carbonyl groups.

Such double bonds can preferably be introduced into the polyether carbonate by use of glycidyl esters of α,β-unsaturated acids, such as acrylic acid or methacrylic acid, as comonomer in the copolymerization with $CO_2$. In a preferred embodiment, the double bonds can also be introduced through the use of cyclic anhydrides bearing double bonds adjacent to a carbonyl group as comonomers in the copolymerization with epoxides and $CO_2$.

It is also possible to functionalize polyether carbonates with alkoxysilyl groups bearing simultaneously electron-rich and -deficient double bonds. Polyether carbonate mixtures having various unsaturated units can also be used for the functionalization with alkoxysilyl groups. However, preference is given to polyether carbonates or mixtures of polyether carbonates in which the molar content of electron-rich double bonds is greater than or equal to the content of electron-deficient double bonds. Very particular preference is given to using polyether carbonates containing electron-rich double bonds only.

Specifically for the hydrosilylation, preference is given to double bonds having a free $=CH_2$ group. These are called α-olefins and generally have only low steric hindrance at the double bond and can therefore be reacted relatively easily. Allyl glycidyl ethers or vinylcyclohexene oxide are, by way of example, epoxides usable as comonomers that introduce such double bonds into the polyether carbonate chain.

In addition, monomers used may be alkylene oxides (epoxides) having 2-45 carbon atoms that do not bear a double bond. The alkylene oxides having 2-45 carbon atoms are, for example, one or more compounds selected from the group comprising ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, epoxides of C6-C22 α-olefins, such as 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, C1-C24 esters of epoxidized fatty acids, epichlorohydrin, glycidol, and derivatives of glycidol, for example glycidyl ethers of C1-C22 alkanols and glycidyl esters of C1-C22 alkanecarboxylic acids. Examples of derivatives of glycidol are phenyl glycidyl ether, cresyl glycidyl ether, methyl glycidyl ether, ethyl glycidyl ether and 2-ethylhexyl glycidyl ether. Alkylene oxides used may preferably be ethylene oxide and/or propylene oxide, especially propylene oxide.

In one embodiment of the process, the polyether carbonate polyol having unsaturated groups used is obtained by a process comprising the steps of:

(α) initially charging an H-functional starter compound and a catalyst, (γ) metering in carbon dioxide and
at least one epoxide and
at least one unsaturated monomer selected from the group of the unsaturated epoxides and unsaturated cyclic anhydrides.

In a preferred embodiment, the process for preparing the polyether carbonate polyol having unsaturated groups used comprises, between step (α) and step (γ), the step (β) of metering in at least one epoxide.

This mode of preparation leads to polyether carbonates having unsaturated groups which are particularly suitable within the context of the further modification with alkoxysilane compounds. These polyether carbonates having unsaturated groups exhibit good reactivity. Polyether carbonates having unsaturated side chains show particularly low viscosity, which, without being bound by theory, is caused by the reduction in the intramolecular polymer-polymer interactions caused by the incorporation of the unsaturated side chains. Especially the terpolymerization with epoxides, where at least one of the epoxides bears a double bond, and/or epoxides with cyclic anhydrides shows this effect and is much more advantageous compared to a "simple" polymerization with just one monomer species having unsaturated side chains. In a further embodiment, the heavier of the epoxides metered in may be selected from the group of the glycidyl ethers bearing at least one unsaturated bond.

The catalyst used for the preparation of the low-viscosity polyether carbonate polyols of the invention having side chains may, for example, be a DMC catalyst (double metal cyanide catalyst). Additionally or alternatively it is also possible to use other catalysts for the copolymerization of alkylene oxides and $CO_2$ active catalysts, such as zinc carboxylates or cobalt-salen complexes, for example. Examples of suitable zinc carboxylates are zinc salts of carboxylic acids, especially dicarboxylic acids, such as adipic acid or glutaric acid. An overview of the known catalysts for the copolymerization of alkylene oxides and $CO_2$ is provided for example by Chemical Communications 47 (2011) 141-163. The catalyst is preferably a DMC catalyst.

An advantageous procedure in this embodiment is characterized in that:

($\alpha$) [first activation stage] a suspension medium, an H-functional starter compound, a mixture of suspension medium and at least one H-functional starter compound, or a mixture of at least two H-functional starter compounds is initially charged, and water and/or other volatile compounds are optionally removed by elevated temperature and/or reduced pressure, with the catalyst being added to the suspension medium, the H-functional starter compound, the mixture of suspension medium and at least one H-functional starter compound, or the mixture of at least two H-functional starter compounds, before or after the 1st activation stage, ($\gamma$) [polymerization stage] one or more alkylene oxides, one or more comonomers and carbon dioxide are metered continuously into the mixture that results from step (13), the alkylene oxides used for the terpolymerization being the same as or different than those used in step (0) and at least one of the comonomers metered in being an epoxide having a C2-C15 alkenyl group or an unsaturated hydride.

Preferably, between step ($\alpha$) and step ($\gamma$), a portion (relative to the total amount of the amount of alkylene oxides used in steps ($\beta$) and ($\gamma$)) of one or more alkylene oxides is added to the mixture resulting from step ($\alpha$) (($\beta$) [second activation stage]). The addition of a portion of alkylene oxide can optionally be effected in the presence of $CO_2$ and/or inert gas (for example nitrogen or argon). Multiple metered addition is likewise possible.

Step ($\alpha$):

The addition of the individual components in step ($\alpha$) can be effected simultaneously or successively in any sequence; preferably, in step ($\alpha$), the DMC catalyst is first initially charged and the H-functional starter compound is added simultaneously or subsequently.

A preferred embodiment provides a process wherein, in step ($\alpha$), ($\alpha$1) a reactor is initially charged with the DMC catalyst and one or more H-functional starter compounds, ($\alpha$2) [first activation stage] an inert gas (for example, nitrogen or a noble gas such as argon), an inert gas/carbon dioxide mixture, or carbon dioxide is passed through the reactor at a temperature of 50 to 200° C., preferably of 80 to 160° C., more preferably of 125 to 135° C., and at the same time a reduced pressure (absolute) of 10 mbar to 800 mbar, preferably of 40 mbar to 200 mbar, is set in the reactor by removal of the inert gas or carbon dioxide (with a pump, for example).

A further preferred embodiment provides a process wherein, in step ($\alpha$), ($\alpha$1) the H-functional starter compound or a mixture of at least two H-functional starter compounds is initially charged, optionally under inert gas atmosphere, under an atmosphere of inert gas-carbon dioxide mixture or under a pure carbon dioxide atmosphere, more preferably under inert gas atmosphere and ($\alpha$2) [first activation stage] an inert gas, an inert gas-carbon dioxide mixture or carbon dioxide, more preferably an inert gas, is introduced into the resulting mixture of DMC catalyst and one or more H-functional starter compounds at a temperature of 50 to 200° C., preferably of 80 to 160° C., more preferably of 125 to 135° C., and at the same time, by removing the inert gas or carbon dioxide (with a pump, for example), a reduced pressure (absolute) of 10 mbar to 800 mbar, preferably of 40 mbar to 200 mbar, is set in the reactor, it being possible to add the double metal cyanide catalyst to the H-functional starter compound or to the mixture of at least two H-functional starter compounds in step (al) or immediately thereafter in step ($\alpha$2).

The DMC catalyst may be added in solid form or in a solvent and/or in suspension in an H-functional starter compound. If the DMC catalyst is added as a suspension, this is preferably added in step (al) to the one or more H-functional starter compounds.

Step ($\beta$):

Step ($\beta$) of the second activation stage may take place in the presence of $CO_2$ and/or an inert gas. Step ($\beta$) preferably takes place under an atmosphere composed of an inert gas/carbon dioxide mixture (nitrogen/carbon dioxide or argon/carbon dioxide, for example) or a carbon dioxide atmosphere, more preferably under a carbon dioxide atmosphere. The establishment of an inert gas/carbon dioxide atmosphere or a carbon dioxide atmosphere and the metering of one or more alkylene oxides may take place in principle in different ways. The supply pressure is preferably established by introduction of carbon dioxide, where the pressure (in absolute terms) is 10 mbar to 100 bar, preferably 100 mbar to 50 bar and especially preferably 500 mbar to 50 bar. The start of the metered addition of the alkylene oxide may take place at any supply pressure chosen beforehand. The total pressure (in absolute terms) of the atmosphere set in step ($\beta$) is preferably a range from 10 mbar to 100 bar, preferably 100 mbar to 50 bar, and more preferably 500 mbar to 50 bar. Optionally, during or after the metered addition of the alkylene oxide, the pressure can be readjusted by introducing further carbon dioxide, where the pressure (in absolute terms) is 10 mbar to 100 bar, preferably 100 mbar to 50 bar and more preferably 500 mbar to 50 bar.

In a preferred embodiment, the amount of one or more alkylene oxides used in the activation in step ($\beta$) may be 0.1 to 25.0 wt %, preferably 1.0 to 20.0 wt %, especially preferably 2.0 to 16.0 wt %, based on the amount of H-functional starter compound used in step ($\alpha$). The alkylene oxide can be added in one step or stepwise in two or more portions.

In a particularly preferred embodiment, during the activation in step ($\beta$), a portion (relative to the total amount of the amount of alkylene oxides used in steps ($\beta$) and ($\gamma$)) of one or more alkylene oxides can be added to the mixture resulting from step ($\alpha$) [second activation stage]. The addition of a portion of alkylene oxide may take place optionally in the presence of $CO_2$ and/or inert gas. Step (β) may also take place more than once. The DMC catalyst is preferably used in an amount such that the content of DMC catalyst in the resulting polyether carbonate is 10 to 10 000 ppm, more preferably 20 to 5000 ppm, and most preferably 50 to 500 ppm.

In the second activation step, the alkylene oxide may be added, for example, in one portion or over the course of 1 to 15 minutes, preferably 5 to 10 minutes. The duration of the second activation step is preferably 15 to 240 minutes, more preferably 20 to 60 minutes.

Step (γ):

The metered addition of the epoxide(s) and the carbon dioxide can be effected simultaneously, alternately or sequentially, where the total amount of carbon dioxide can be added all at once or metered in over the reaction time. It is possible during the addition of the epoxides to raise or to lower the $CO_2$ pressure, gradually or in steps, or to leave it constant. Preferably, the total pressure is kept constant during the reaction by metered addition of further carbon dioxide. The metered addition of the epoxide(s) and of the $CO_2$ may take place simultaneously, alternatively or sequentially to the metered addition of carbon dioxide. It is possible to meter in the epoxide at a constant metering rate or to raise or lower the metering rate continuously or in steps, or to add the epoxide in portions. Preferably, the epoxide is added to the reaction mixture at a constant metering rate. Where two or more epoxides are used within one stage for the synthesis of the polyether carbonates, the epoxides may be metered in individually or as a mixture.

The metered addition of the epoxides may take place simultaneously, alternately, or sequentially via in each case separate feeds (additions), or via one or more feeds, in which case the alkylene oxides may be metered in individually or as a mixture. It is possible via the manner and/or sequence of the metered addition of the epoxides and/or the carbon dioxide to synthesize random, alternating, block or gradient polyether carbonates.

Preferably, an excess of carbon dioxide is used, based on the calculated amount of carbon dioxide required in the polyether carbonate, since an excess of carbon dioxide is advantageous because of the low reactivity of carbon dioxide. The amount of carbon dioxide can be specified by way of the total pressure. An advantageous total pressure (in absolute terms) for the copolymerization for preparation of the polyether carbonates has been found to be in the range from 0.01 to 120 bar, preferably 0.1 to 110 bar, more preferably from 1 to 100 bar. It is possible to supply the carbon dioxide to the reaction vessel continuously or discontinuously. This depends on how quickly the epoxides and the $CO_2$ are consumed and on whether the product is to include any $CO_2$-free polyether blocks or blocks with different $CO_2$ contents. The concentration of carbon dioxide may also be varied during the addition of the epoxides. Depending on the reaction conditions selected, it is possible for the $CO_2$ to be introduced into the reactor in the gaseous, liquid or supercritical state. $CO_2$ can also be added to the reactor in solid form and then be converted under the selected reaction conditions to the gaseous, dissolved, liquid and/or supercritical state.

In step (γ), the carbon dioxide can be introduced into the mixture, for example, by (i) sparging the reaction mixture in the reactor from below, (ii) using a hollow-shaft stirrer, (iii) a combination of metering forms as per (i) and (ii), and/or (iv) sparging via the surface of the liquid, by using multilevel stirring elements.

Step (γ) can be conducted, for example, at temperatures of 60 to 150° C., preferably from 80 to 120° C., most preferably from 90 to 110° C. If temperatures below 60° C. are set, the reaction ceases. At temperatures above 150° C., there is a sharp rise in the quantity of unwanted by-products.

The sparging of the reaction mixture in the reactor as per (i) is preferably effected by means of a sparging ring, a sparging nozzle, or by means of a gas inlet tube. The sparging ring is preferably an annular arrangement or two or more annular arrangements of sparging nozzles, preferably arranged at the base of the reactor and/or on the side wall of the reactor.

The hollow-shaft stirrer as per (ii) is preferably a stirrer in which the gas is introduced into the reaction mixture via a hollow shaft in the stirrer. The rotation of the stirrer in the reaction mixture (i.e. in the course of mixing) gives rise to a reduced pressure at the end of the stirrer paddle connected to the hollow shaft, such that the gas phase (containing $CO_2$ and any unconsumed alkylene oxide) is sucked out of the gas space above the reaction mixture and is passed through the hollow shaft of the stirrer into the reaction mixture.

The sparging of the reaction mixture as per (i), (ii), (iii) or (iv) may take place with freshly metered carbon dioxide in each case and/or may be combined with suction of the gas from the gas space above the reaction mixture and subsequent recompression of the gas. For example, the gas suctioned off from the gas space above the reaction mixture and compressed, optionally mixed with fresh carbon dioxide and/or alkylene oxide, is introduced again into the reaction mixture as per (i), (ii), (iii) and/or (iv).

The pressure drop which comes about via incorporation of the carbon dioxide and of the epoxides into the reaction product during the terpolymerization is preferably compensated by freshly metered in carbon dioxide.

The introduction of the epoxide can be effected separately or together with the $CO_2$, either via the liquid surface or directly into the liquid phase. Preferably, the epoxide is introduced directly into the liquid phase, since this has the advantage of rapid mixing of the epoxide introduced with the liquid phase and so local concentration peaks of epoxides can be avoided. The introduction into the liquid phase can be effected via one or more inlet tubes, one or more nozzles or one or more annular arrangements of multiple metering points, which are preferably arranged at the base of the reactor and/or at the side wall of the reactor.

The three steps (α), (β) and (γ) can be performed in the same reactor, or each can be performed separately in different reactors. Particularly preferred reactor types are stirred tanks, tubular reactors, and loop reactors. If the reaction steps (α), (β) and (γ) are performed in different reactors, a different reactor type can be used for each step.

Polyether carbonates can be prepared in a stirred tank, in which case the stirred tank, according to the design and mode of operation, is cooled via the reactor shell, internal cooling surfaces and/or cooling surfaces within a pumped circulation system. Both in semibatchwise application, in which the product is not removed until after the end of the reaction, and in continuous application, where the product is removed continuously, particular attention should be given to the metering rate of the epoxides. It should be set so that, in spite of the inhibitory effect of the carbon dioxide, the epoxides are depleted sufficiently rapidly by reaction. The concentration of free epoxides in the reaction mixture during the second activation stage (step β) is preferably >0 to 100 wt %, more preferably >0 to 50 wt %, most preferably >0 to 20 wt % (based in each case on the weight of the reaction mixture). The concentration of free epoxides in the reaction mixture during the reaction (step γ) is preferably >0 to 40 wt %, more preferably >0 to 25 wt %, most preferably >0 to 15 wt % (based in each case on the weight of the reaction mixture).

A further embodiment in a stirred tank for the copolymerization (step γ) is characterized in that one or more H-functional starter compounds are also metered continuously into the reactor during the reaction. In the case of performance of the process in semi-batchwise operation, the amount of the H-functional starter compounds which are metered continuously into the reactor during the reaction is preferably at least 20 mol % equivalents, more preferably 70 to 95 mol % equivalents (based in each case on the total amount of H-functional starter compounds). In the case of continuous performance of the process, the amount of the H-functional starter compounds which are metered continuously into the reactor during the reaction is preferably at least 80 mol % equivalents, more preferably 95 to 99.99 mol % equivalents (based in each case on the total amount of H-functional starter compounds).

In a preferred embodiment, the catalyst-starter mixture activated as per steps (α) and (β) is reacted further with epoxides and carbon dioxide in the same reactor.

In a further preferred embodiment, the catalyst-starter mixture activated as per steps (α) and (β) is reacted further with epoxides and carbon dioxide in another reaction vessel (for example a stirred tank, tubular reactor or loop reactor). In a further preferred embodiment, the catalyst/starter mixture prepared in step (α) is reacted in a different reaction vessel (for example, a stirred tank, tubular reactor or loop reactor) in steps (β) and (γ) with epoxides and carbon dioxide.

In the case of reaction in a tubular reactor, the catalyst/starter mixture prepared in step (α), or the catalyst/starter mixture activated in steps (α) and (β), and optionally further starter compounds, and also epoxides and carbon dioxide, are pumped continuously through a tube. When a catalyst-starter mixture prepared as per step (α) is used, the second activation stage as per step (β) can be effected in the first part of the tubular reactor and the terpolymerization as per step (γ) in the second part of the tubular reactor. The molar ratios of the co-reactants may vary according to the desired polymer.

In a preferred embodiment, carbon dioxide is metered in in its liquid or supercritical form, in order to enable optimal miscibility of the components. The carbon dioxide can be introduced at the inlet of the reactor and/or via metering points which are arranged along the reactor, in the reactor. A portion of the epoxides may be introduced at the inlet of the reactor. The remaining amount of the epoxides is preferably introduced into the reactor via a plurality of metering points arranged along the reactor. Mixing elements of the kind sold, for example, by Ehrfeld Mikrotechnik BTS GmbH are advantageously installed for more effective mixing of the co-reactants, or mixer-heat exchanger elements, which at the same time improve mixing and heat removal. The mixing elements preferably mix metered-in $CO_2$ and epoxides with the reaction mixture. In an alternative embodiment, different volume elements of the reaction mixture are mixed with one another.

Loop reactors can likewise be used to prepare polyether carbonates having unsaturated groups that are usable in accordance with the invention. These generally include reactors having internal and/or external material recycling (optionally with heat exchange surfaces arranged in the circulation system), for example a jet loop reactor or Venturi loop reactor, which can also be operated continuously, or a tubular reactor designed in the form of a loop with suitable apparatuses for the circulation of the reaction mixture, or a loop of several series-connected tubular reactors or a plurality of series-connected stirred tanks.

In order to achieve full conversion, the reaction apparatus in which step (γ) is carried out may frequently be followed by a further tank or a tube ("dwell tube") in which residual concentrations of free epoxides present after the reaction are depleted by reaction. Preferably, the pressure in this downstream reactor is at the same pressure as in the reaction apparatus in which reaction step (γ) is performed. The pressure in the downstream reactor can, however, also be selected at a higher or lower level. In a further preferred embodiment, the carbon dioxide, after reaction step (γ), is fully or partly released and the downstream reactor is operated at standard pressure or a slightly elevated pressure. The temperature in the downstream reactor is preferably 10° C. to 150° C. and more preferably 20° C. to 100° C. At the end of the post-reaction time or at the outlet of the downstream reactor, the reaction mixture contains preferably less than 0.05 wt % of epoxide. The post-reaction time or the residence time in the downstream reactor is preferably 10 min to 24 h, especially preferably 10 min to 3 h.

As suitable H-functional starter compounds (starters) it is possible to use compounds having H atoms that are active in respect of the alkoxylation. Groups active in respect of the alkoxylation and having active hydrogen atoms are, for example, —OH, —NH$_2$ (primary amines), —NH— (secondary amines), —SH, and —CO$_2$H, preferably —OH and NH$_2$, more preferably —OH. As H-functional starter compound may, for example, one or more compounds selected from the group comprising mono- or polyhydric alcohols, polyfunctional amines, polyhydric thiols, amino alcohols, thio alcohols, hydroxy esters, polyether polyols, polyester polyols, polyester ether polyols, polyether carbonate polyols, polycarbonate polyols, polycarbonates, polyethyleneimines, polyetheramines (for example the products called Jeffamines® from Huntsman, for example D-230, D-400, D-2000, T-403, T-3000, T-5000 or corresponding BASF products, for example Polyetheramine D230, D400, D200, T403, T5000), polytetrahydrofurans (e.g. PolyTHF® from BASF, for example PolyTHF® 250, 650S, 1000, 1000S, 1400, 1800, 2000), polytetrahydrofuranamines (BASF product Polytetrahydrofuranamine 1700), polyether thiols, polyacrylate polyols, castor oil, the mono- or diglyceride of ricinoleic acid, monoglycerides of fatty acids, chemically modified mono-, di- and/or triglycerides of fatty acids, and C1-C24-alkyl fatty acid esters containing an average of at least 2 OH groups per molecule. The C1-C23 alkyl fatty acid esters which contain on average at least 2 OH groups per molecule are, for example, commercial products such as Lupranol Balance® (BASF AG), Merginol® products (Hobum Oleochemicals GmbH), Sovermol® products (Cognis Deutschland GmbH & Co. KG), and Soyol®TM products (USSC Co.).

Monofunctional starter compounds used may be alcohols, amines, thiols and carboxylic acids. Monofunctional alcohols used may be: methanol, ethanol, 1-propanol, 2-propanol, 1-butanol, 2-butanol, tert-butanol, 3-buten-1-ol, 3-butyn-1-ol, 2-methyl-3-buten-2-ol, 2 methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Useful monofunctional amines include: butylamine, tert-butylamine, pentylamine, hexylamine, aniline, aziridine, pyrrolidine, piperidine, morpholine. Monofunctional thiols used may be: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter compounds are, for example, dihydric alcohols (for example ethylene glycol, diethylene glycol, propylene glycol, dipropylene glycol, propane-1,3-diol, butane-1,4-diol, butene-1,4-diol, butyne-1,4-diol, neopentyl glycol, pentane-1,5-diol, methylpentanediols (for example 3-methylpentane-1,5-diol), hexane-1,6-diol; octane-1,8-diol, decane-1,10-diol, dodecane-1,12-diol, bis(hydroxymethyl)cyclohexanes (for example 1,4-bis(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, in particular castor oil), and all modification products of these aforementioned alcohols with different amounts of ε-caprolactone.

The H-functional starter compounds may also be selected from the substance class of the polyether polyols, especially those having a molecular weight $M_n$ in the range from 100 to 4000 g/mol. Preference is given to polyether polyols formed from repeat ethylene oxide and propylene oxide units, preferably having a proportion of 35% to 100% propylene oxide units, more preferably having a proportion of 50% to 100% propylene oxide units. These may be random copolymers, gradient copolymers, alternating copolymers or block copolymers of ethylene oxide and propylene oxide. Suitable polyether polyols formed from repeat propylene oxide and/or ethylene oxide units are, for example, the Desmophen®, Acclaim®, Arcol®, Baycoll®, Bayfill®, Bayflex®, Baygal®, PET® and polyether polyols from Bayer MaterialScience AG (for example Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homopolyethylene oxides are, for example, the Pluriol® E products from BASF SE, suitable homopolypropylene oxides are, for example, the Pluriol® P products from BASF SE; suitable mixed copolymers of ethylene oxide and propylene oxide are, for example, the Pluronic® PE or Pluriol® RPE products from BASF SE.

The H-functional starter compounds may also be selected from the substance class of the polyester polyols, especially those having a molecular weight $M_n$ in the range from 200 to 4500 g/mol. Polyesters having a functionality of at least two can be used as polyester polyols. Preferably, polyester polyols consist of alternating acid and alcohol units. Examples of acid components which can be used include succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride, or mixtures of the stated acids and/or anhydrides. Examples of alcohol components used include ethanediol, 1,2-propanediol, 1,3-propanediol, 1,4-butanediol, 1,5-pentanediol, neopentyl glycol, 1,6-hexanediol, 1,4-bis(hydroxymethyl)cyclohexane, diethylene glycol, dipropylene glycol, trimethylolpropane, glycerol, pentaerythritol, or mixtures of the stated alcohols. Employing dihydric or polyhydric polyether polyols as the alcohol component affords polyester ether polyols which can likewise serve as starter compounds for preparation of the polyether carbonate polyols. Preference is given to using polyether polyols with $M_n$=150 to 2000 g/mol for preparation of the polyester ether polyols.

As H-functional starter compounds it is possible, furthermore, to use polycarbonate diols, more particularly those having a molecular weight $M_n$ in the range from 150 to 4500 g/mol, preferably 500 to 2500 g/mol, which are prepared, for example, by reaction of phosgene, dimethyl carbonate, diethyl carbonate or diphenyl carbonate with difunctional alcohols or polyester polyols or polyether polyols. Examples relating to polycarbonates are found for example in EP-A 1359177. As polycarbonate diols it is possible for example to use the Desmophen® C grades from Bayer MaterialScience AG, such as Desmophen® C 1100 or Desmophen® C 2200, for example.

In a further embodiment, polyether carbonate polyols and/or polyetherester carbonate polyols can be used as H-functional starter compounds. In particular it is possible to use polyetherester carbonate polyols. These polyetherester carbonate polyols used as H-functional starter compounds may for this purpose be prepared in a separate reaction step beforehand.

The H-functional starter compounds generally have an OH functionality (i.e., number of polymerization-active H atoms per molecule) of 1 to 8, preferably of 2 to 6, and more preferably of 2 to 4. The H-functional starter compounds are used either individually or as a mixture of at least two H-functional starter compounds.

Preferred H-functional starter compounds are alcohols having a composition according to the general formula (III), $$HO-(CH_2)_x-OH \quad (III)$$

where x is a number from 1 to 20, preferably an even number from 2 to 20. Examples of alcohols of formula (III) are ethylene glycol, butane-1,4-diol, hexane-1,6-diol, octane-1,8-diol, decane-1,10-diol and dodecane-1,12-diol. Further preferred H-functional starter compounds are neopentyl glycol, trimethylolpropane, glycerol, pentaerythritol, reaction products of the alcohols of formula (III) with ε-caprolactone, e.g. reaction products of trimethylolpropane with ε-caprolactone, reaction products of glycerol with ε-caprolactone, and reaction products of pentaerythritol with ε-caprolactone. Preference is further given to using, as H-functional starter compounds, water, diethylene glycol, dipropylene glycol, castor oil, sorbitol and polyether polyols formed from repeating polyalkylene oxide units.

More preferably, the H-functional starter compounds are one or more compounds selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane, di- and trifunctional polyether polyols, where the polyether polyol has been formed from a di- or tri-H-functional starter compound and propylene oxide or a di- or tri-H-functional starter compound, propylene oxide and ethylene oxide. The polyether polyols preferably have an OH functionality of 2 to 4 and a molecular weight $M_n$ in the range from 62 to 4500 g/mol and more particularly a molecular weight $M_n$ in the range from 62 to 3000 g/mol.

Double metal cyanide (DMC) catalysts for use in the homopolymerization of alkylene oxides are known in principle from the prior art (see, for example, U.S. Pat. Nos. 3,404,109, 3,829,505, 3,941,849 and 5,158,922). DMC catalysts which are described in, for example, U.S. Pat. No. 5,470,813, EP-A 700 949, EP-A 743 093, EP-A 761 708, WO 97/40086, WO 98/16310 and WO 00/47649 possess a very high activity and permit the production of polyether carbonates at very low catalyst concentrations. A typical example is that of the highly active DMC catalysts which are described in EP-A 700 949 and contain, as well as a double metal cyanide compound (e.g. zinc hexacyanocobaltate(III)) and an organic complex ligand (e.g. tert-butanol), also a polyether having a number-average molecular weight greater than 500 g/mol.

The DMC catalysts which can be used in accordance with the invention are preferably obtained by
(1.) in the first step, reacting an aqueous solution of a metal salt with the aqueous solution of a metal cyanide salt in the presence of one or more organic complex ligands, e.g. an ether or alcohol,
(2.) in the second step, using known techniques (such as centrifuging or filtering) to remove the solid from the suspension obtained from (α),
(3.) optionally, in a third step, washing the isolated solid with an aqueous solution of an organic complex ligand (e.g. by resuspending and subsequently again isolating by filtering or centrifuging),
(4.) and subsequently drying the resulting solid, optionally after pulverizing, at temperatures of in general 20-120° C. and at pressures of in general 0.1 mbar to atmospheric pressure (1013 mbar),
wherein in the first step or immediately after the precipitation of the double metal cyanide compound (second step) one or more organic complex ligands, preferably in excess (based on the double metal cyanide compound), and optionally further complex-forming components are added.

The double metal cyanide compounds included in the DMC catalysts which can be used in accordance with the invention are the reaction products of water-soluble metal salts and water-soluble metal cyanide salts.

For example, an aqueous zinc chloride solution (preferably in excess relative to the metal cyanide salt) and potassium hexacyanocobaltate are mixed and then dimethoxyethane (glyme) or tert-butanol (preferably in excess, relative to zinc hexacyanocobaltate) is added to the resulting suspension.

Metal salts suitable for preparation of the double metal cyanide compounds preferably have a composition according to the general formula (IV), $$M(X)_n \quad (IV)$$

where

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$, X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

n is 1 if X=sulfate, carbonate or oxalate and n is 2 if X=halide, hydroxide, carboxylate, cyanate, thiocyanate, isocyanate, isothiocyanate or nitrate, or suitable metal salts preferably have a composition according to the general formula (V), $$M_r(X)_3 \quad (V)$$

where

M is selected from the metal cations $Fe^{3+}$, $Al^{3+}$, $Co^{3+}$ and $Cr^{3+}$, X comprises one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

r is 2 if X=sulfate, carbonate or oxalate and r is 1 if X=halide, hydroxide, carboxylate, cyanate, thiocyanate, isocyanate, isothiocyanate or nitrate, or suitable metal salts preferably have a composition according to the general formula (VI), $$M(X)_s \quad (VI)$$

where

M is selected from the metal cations $Mo^{4+}$, $V^{4+}$ and $W^{4+}$,

X comprises one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

s is 2 if X=sulfate, carbonate or oxalate and s is 4 if X=halide, hydroxide, carboxylate, cyanate, thiocyanate, isocyanate, isothiocyanate or nitrate, or suitable metal salts preferably have a composition according to the general formula (VII), $$M(X)_t \quad (VII)$$

where

M is selected from the metal cations $Mo^{6+}$ and $W^{6+}$,

X comprises one or more (i.e. different) anions, preferably anions selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

t is 3 if X=sulfate, carbonate or oxalate and t is 6 if X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparing the double metal cyanide compounds preferably have a composition according to the general formula (VIII)

$$(Y)_a M'(CN)_b (A)_c \quad (VIII)$$

where

M' is selected from one or more metal cations from the group consisting of Fe(II), Fe(III), Co(II), Co(III), Cr(II), Cr(III), $M_n$(II), $M_n$(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^+$, $Na^+$, $K^+$, $Rb^+$) and alkaline earth metal (i.e. $Be^{2+}$, $Ca^{2+}$, $Sr^{2+}$, $Ba^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate and nitrate, and a, b and c are integers, where the values of a, b and c are selected so as to give an electrically neutral metal cyanide salt; a is preferably 1, 2, 3 or 4; b is preferably 4, 5 or 6; c preferably has the value of 0.

Examples of suitable metal cyanide salts are sodium hexacyanocobaltate(III), potassium hexacyanocobaltate (III), potassium hexacyanoferrate(II), potassium hexacyanoferrate(III), calcium hexacyanocobaltate(III) and lithium hexacyanocobaltate(III).

Preferred double metal cyanide compounds included in the DMC catalysts which can be used in accordance with the invention are compounds having compositions according to the general formula (IX)

$$M_x[M'_{x'}(CN)_y]_z \quad (IX)$$

in which M is defined as in the formulae (IV) to (VII) and M' is as defined in formula (VIII), and x, x', y and z are integers and are chosen so as to give electron neutrality of the double metal cyanide compound.

Preferably, x=3, x'=1, y=6 and z=2,

M=Zn(II), Fe(II), Co(II) or Ni(II) and

M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). With particular preference it is possible to use zinc hexacyanocobaltate(III).

The organic complex ligands which can be added in the preparation of the DMC catalysts are disclosed in, for example, U.S. Pat. No. 5,158,922 (see, in particular, column 6, lines 9 to 65), U.S. Pat. Nos. 3,404,109, 3,829,505, 3,941,849, EP-A 700 949, EP-A 761 708, JP 4 145 123, U.S. Pat. No. 5,470,813, EP-A 743 093 and WO-A 97/40086). The organic complex ligands used are, for example, water-soluble organic compounds containing heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds containing both aliphatic or cycloaliphatic ether groups and aliphatic hydroxyl groups (for example ethylene glycol mono-tert-butyl ether, diethylene glycol mono-tert-butyl ether, tripropylene glycol monomethyl ether and 3-methyl-3-oxetanemethanol). Extremely preferred organic complex ligands are selected from one or more compounds of the group consisting of dimethoxyethane, tert-butanol 2-methyl-3-buten-2-ol, 2-methyl-3-butyn-2-ol, ethylene glycol mono-tert-butyl ether, and 3-methyl-3-oxetanemethanol.

In the preparation of the DMC catalysts that can be used in accordance with the invention, one or more complex-forming components are optionally used from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly (N-vinylpyrrolidone-co-acrylic acid), polyvinyl methyl ketone, poly(4-vinylphenol), poly(acrylic acid-co-styrene), oxazoline polymers, polyalkyleneimines, maleic acid copolymers and maleic anhydride copolymers, hydroxyethylcellulose and polyacetals, or of the glycidyl ethers, glycosides, carboxylic esters of polyhydric alcohols, gallic acids or salts, esters or amides thereof, cyclodextrins, phosphorus compounds, α,β-unsaturated carboxylic esters, or ionic surface-active or interface-active compounds.

In the preparation of the DMC catalysts that can be used in accordance with the invention, preference is given to using the aqueous solutions of the metal salt (e.g. zinc chloride) in the first step in a stoichiometric excess (at least 50 mol %) relative to the metal cyanide salt. This corresponds at least to a molar ratio of metal salt to metal cyanide salt of 2.25:1.00. The metal cyanide salt (e.g. potassium hexacyanocobaltate) is reacted in the presence of the organic complex ligand (e.g. tert-butanol) to form a suspension which contains the double metal cyanide compound (e.g. zinc hexacyanocobaltate), water, excess metal salt, and the organic complex ligand.

This organic complex ligand may be present in the aqueous solution of the metal salt and/or of the metal cyanide salt, or it is added directly to the suspension obtained after precipitation of the double metal cyanide compound. It has proven advantageous to mix the metal salt and metal cyanide salt aqueous solutions and the organic complex ligand by stirring vigorously. Optionally, the suspension formed in the first step is subsequently treated with a further complex-forming component. The complex-forming component is preferably used in a mixture with water and organic complex ligand. A preferred process for performing the first step (i.e. the preparation of the suspension) is effected using a mixing nozzle, more preferably using a jet disperser, as described, for example, in WO-A 01/39883.

In the second step, the solid (i.e. the precursor of the catalyst) can be isolated from the suspension by known techniques, such as centrifugation or filtration.

In a preferred execution variant, the isolated solid is subsequently washed in a third process step with an aqueous solution of the organic complex ligand (for example by resuspension and subsequent reisolation by filtration or centrifugation). In this way, for example, water-soluble byproducts, such as potassium chloride, can be removed from the catalyst that can be used in accordance with the invention. The amount of the organic complex ligand in the aqueous wash solution is preferably between 40 and 80 wt %, based on the overall solution.

Optionally in the third step the aqueous wash solution is admixed with a further complex-forming component, preferably in a range between 0.5 and 5 wt %, based on the overall solution.

It is moreover advantageous to wash the isolated solid more than once. In a first washing step (3.-1), washing takes place preferably with an aqueous solution of the unsaturated alcohol (for example by resuspension and subsequent reisolation by filtration or centrifugation), in order thereby to remove, for example, water-soluble byproducts, such as potassium chloride, from the catalyst that can be used in accordance with the invention. The amount of the unsaturated alcohol in the aqueous wash solution is more preferably between 40 and 80 wt %, based on the overall solution of the first washing step. In the further washing steps (3.-2), either the first washing step is repeated one or more times, preferably from one to three times, or, preferably, a non-aqueous solution, such as a mixture or solution of unsaturated alcohol and further complex-forming component (preferably in the range between 0.5 and 5 wt %, based on the total amount of the wash solution of step (3.-2)), is employed as the wash solution, and the solid is washed with it one or more times, preferably one to three times.

The isolated and optionally washed solid can then be dried, optionally after pulverization, at temperatures of 20-100° C. and at pressures of 0.1 mbar to atmospheric pressure (1013 mbar).

One preferred method for isolating the DMC catalysts that can be used in accordance with the invention from the suspension by filtration, filtercake washing and drying is described in WO-A 01/80994.

The unsaturated comonomers may be distributed statically or in blocks in the polyether carbonates. Gradient polymers can also be used.

In one possible execution of the process, the polyether carbonate having unsaturated groups in process step (a) may have a proportion of unsaturated comonomers within the polyether carbonate amounting to ≥0.1 mol % and ≤50 mol %. In the course of the further functionalization of the polyether carbonates having unsaturated groups used in accordance with the invention, the provision of a defined number of functionalizing possibilities that is situated within the range specified above has proven particularly advantageous. This means that an average of every 2nd to every 1000th monomer unit within the polymer chain in the polyether carbonate used in accordance with the invention bears an unsaturated group and, accordingly, is able to react with an alkoxysilane compounds of the formula (II). This may lead to a sufficient number of crosslinking points in the course of a crosslinking reaction conducted later. In this way it is possible to obtain particularly stable crosslinked polyether carbonate polymers. The proportion of unsaturated comonomers in the polyether carbonates is to be crosslinked may additionally be preferably ≥0.2 mol % and ≤40 mol % and most preferably ≥0.5 mol % and ≤15 mol %.

The molecular weight of the polyether carbonates having unsaturated groups usable in accordance with the invention is preferably at least 400 g/mol, more preferably 400 to 1 000 000 g/mol and most preferably 500 to 60 000 g/mol.

The $CO_2$ content of the polyether carbonates having unsaturated groups usable in accordance with the invention is preferably ≥1 wt % and ≤40 wt %, more preferably ≥10 wt % and ≤30 wt %, and most preferably ≥15 wt % and ≤25 wt %.

In a preferred embodiment of the process, at least one R1 radical may be a C1-C4 alkoxy radical. Specifically the use of at least one short-chain alkoxy radical in the alkoxysilane compound of the formula (II) can contribute to a rapid reaction of the silane compounds used and hence to an economical process regime. Without being bound by theory, a short-chain radical may facilitate the addition of the alkoxysilane compound onto the double bond of the polyether carbonate having unsaturated groups, such that the desired polyether carbonates having alkoxysilyl groups can be obtained with a high yield. Examples of such compounds are 3-mercaptopropyltrimethoxysilane, 3-mercaptopropyltriethoxysilane, 3-mercaptopropylmethyldimethoxysilane, 3-mercaptopropylmethyldiethoxysilane, 3-mercaptopropyldimethylmethoxysilane, 3-mercaptopropyldimethylethoxysilane, mercaptomethyltrimethoxysilane and mercaptomethyltriethoxysilane.

Within an alternative configuration of the process, each of the R radicals may be a C1-C4 alkoxy radical. The use of an alkoxysilane compounds in which each of the R radicals is a short-chain alkoxy radical can contribute to a rapid reaction of the alkoxysilyl compounds used and hence to an economical process regime. Without being bound by theory, short-chain radicals on the alkoxysilyl compound of the formula (II) may facilitate the addition onto the double bond of the polyether carbonate having unsaturated groups, such that the desired polyether carbonates containing alkoxysilyl groups can be obtained with a high yield. Examples of such compounds are 3-mercaptopropyltrimethoxysilane, 3-mercaptopropyltriethoxysilane, 3-mercaptopropylmethyldimethoxysilane, 3-mercaptopropylmethyldiethoxysilane, 3-mercaptopropyldimethylmethoxysilane, 3-mercaptopropyldimethylethoxysilane, mercaptomethyltrimethoxysilane and mercaptomethyltriethoxysilane.

In a further variant of the process, it may be the case that X=Y—S—H and Y may be selected from the group comprising C1-C22 alkyl, C6-C14 aryl, C7-C14 aralkyl, C7-C14 alkylaryl. Without being bound by theory, the addition of mercapto-functional alkoxysilane compounds to polyether carbonates containing double bonds can give polyether carbonates having alkoxysilyl groups. One example of the reaction is shown in scheme (X) where R1 and R2 have the definition given above.

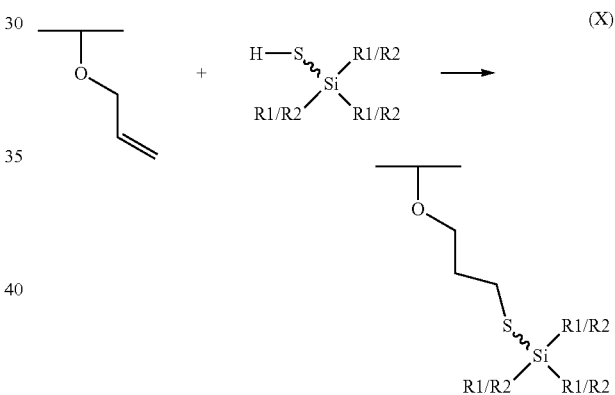

For addition onto the polyether carbonates having unsaturated groups used in accordance with the invention, alkoxysilane compounds having at least one mercapto group have been found to be particularly suitable. These compounds can be added selectively onto the polyether carbonates having unsaturated groups used in accordance with the invention with high yields and as such lead to reproducibly preparable polyether carbonates having alkoxysilyl groups. The mercapto-functional alkoxysilane compounds can be mixed with the unsaturated polyether carbonates in such a ratio that the ratio of double bond to mercapto group is 10:1 to 1:1, preferably 2:1 to 1:1, most preferably nearly 1:1. Preferably, the Y radical is C1-C22 alkylene, C6-C14 arylene, C7-C14 aralkyl or C7-C14 alkylaryl. Preferably, the Y radical may be is a propylene radical. In addition, the other R radicals may be a methyl, ethyl, phenyl or C1-C4 alkoxy radical. More particularly, in addition, at least one of the R radicals may be a C1-C4 alkoxy radical. In a particularly preferred embodiment, all R radicals may be a C1-C4 alkoxy radical. This can facilitate the addition of the alkoxysilane compounds of the formula (II) onto the unsaturated groups of the polyether carbonates.

In addition, in an additional configuration of the process of the invention, in the reaction of the unsaturated polyether carbonate polyol with the alkoxysilane compound of the formula (II), a compound selected from the group of the photoinitiators, metal-activated peroxides and/or redox initiators may be added. To increase the reaction rate of the alkoxysilane compounds of the formula (II) with the unsaturated groups of the polyether carbonates, an initiator can be added to the reaction mixture. The free-radical addition in this context may be accelerated with initiators which are described in T. Myers, N. Kirk-Othmer, Encyclopedia of Chemical Technology (5th Edition) (2005), 14 274-311 or in J. C. Bevington, Makromolekulare Chemie, Macromolecular Symposia (1987), 10(1), 89, photoinitiators which are described in J. P. Fouassier, X. Allonas, J. Lalevee; C. Dietlin, Photochemistry and Photophysics of Polymer Materials (2010) 351-419, metal-activated peroxides which are described in C. Sma, Angewandte Makromolekulare Chemie (1969), 9 165-181, or with redox initiators which are described in G. S. Misra; U. D. N. Bajpai Progress in Polymer Science (1982) 8 (1-2), 61-131.

Preference is given to using photoinitiators for this purpose. Photoinitiators usable in accordance with the invention are, for example, bis(2,4,6-trimethylbenzoyl)phenylphosphine oxide, diphenylmesitoylphosphine oxide, camphorquinone, isopropylthioxanthone, Michler's ketone, benzophenone, benzoin methyl ether, dimethoxyphenylacetophenone or 2,2-dimethyl-2-hydroxyacetophenone. The amount of photoinitiator used may vary. For most purposes, an amount of photoinitiator 0.01 to 10 wt %, preferably 0.1 to 1 wt %, is adequate, based on the weight of the overall composition. The amount required can be determined easily by the person skilled in the art and should be sufficient to give an induction period of less than 1 day, preferably less than 1 hour and most preferably less than 10 minutes.

In the case of use of photoinitiators, the reaction mixture is preferably irradiated with light. The wavelength and intensity of the radiation used may vary and depends on the photoinitiator used. The wavelength and intensity required can be determined easily by the person skilled in the art and should be sufficient to give an induction period of less than 1 day, preferably less than 1 hour and most preferably less than 10 minutes. For irradiation, it is possible, for example, to use medium-pressure mercury lamps as customary in UV curing. For example, the sample can be irradiated with an Amergraph® UV unit (low-intensity UVA) at a dose of about 1 J/cm², measured at 365 nm. It is also possible to use sunlight.

The free-radical initiators can be used in amounts of not less than 0.01 wt % and not more than 2 wt % based on the polyether carbonate. Redox initiators here are a mixture of an oxidizing substance and a reducing substance. The mercapto-functional alkoxysilane compounds used for functionalization may also assume the function of a reducing substance. Type II photoinitiators require the addition of a hydrogen donor, such as an amine or a mercapto compound, although the mercapto-functional alkoxysilane compounds may also fulfill this function.

In a preferred embodiment of the process, X may be H. Without being bound by theory, the addition of alkoxysilane compounds to polyether carbonates containing unsaturated groups can give polyether carbonates containing alkoxysilyl groups according to the following scheme (XI):

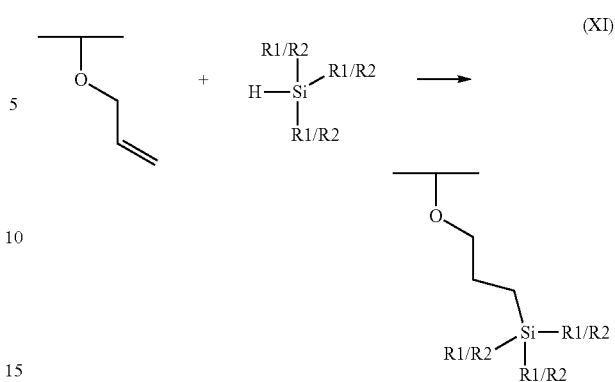

Hydride-functional compounds have been found to be particularly suitable for addition onto the polyether carbonates having unsaturated groups used in accordance with the invention. These compounds can be added selectively onto the polyether carbonates having unsaturated groups with high yields and as such lead to reproducibly preparable polyether carbonates containing alkoxysilyl groups. The hydride-functional alkoxysilyl compounds can be mixed with the unsaturated polyether carbonates in such a ratio that the ratio of double bond to hydride-functional alkoxysilane compound is 10:1 to 1:1, preferably 2:1 to 1:1, most preferably nearly 1:1. Preferably, the R radicals are a methyl, ethyl, phenyl or C1-C4 alkoxy radical. More particularly, in addition, at least one of the R radicals may be a C1-C4 alkoxy radical. In a particularly preferred embodiment, all R radicals may be a C1-C4 alkoxy radical. This can facilitate the addition of the alkoxysilane compounds of the formula (II) onto the unsaturated groups of the polyether carbonates.

In addition, in an additional configuration of the process, in the reaction of the unsaturated polyether carbonate polyol with the alkoxysilane compound of the formula (II), a compound selected from the group of the hydrosilylation catalysts may be added. The hydrosilylation of the polyether carbonate having unsaturated groups can be induced particularly quickly and effectively by the use of platinum and palladium catalysts in a concentration of 1 to 5000 ppm, it being possible to employ homogeneous and heterogeneous catalysts. Suitable catalysts are specified in DE 102011076687. In the case of the homogeneous catalysts, preference is given to Karstedt catalysts. These are complexes of Pt(0) with compounds containing double bonds, especially vinylsilanes such as tetramethyldivinyldisiloxane or tetramethyltetravinylcyclotetrasiloxane. These are described, for example, in the Platinium Metals Review (1997), 41(2), 66. In addition, it is also possible to use Speier catalysts, i.e. complexes of hexachloroplatinic acid with alcohols such as isopropanol. More preferably, it is possible to use Karstedt catalysts. The heterogeneous catalysts are preferably platinum metals, more preferably platinum supported on inorganic supports or charcoal, more preferably on charcoal. It is also possible to add ligands to the heterogeneous catalysts, such as phosphines or nitrogen heterocycles, as activators or co-catalysts. One method for the hydrosilylation of alkene groups can be found, for example, in F. Eckstorff, Y. Zhu, R. Maurer, T. E. Müller, S. Scholz, J. A. Lercher, Polymer 52 (2011) 2492-2498.

In one embodiment, the average number of alkoxysilyl groups per molecule of the polyether carbonate containing alkoxysilyl groups obtained may be within a range from ≥1 and ≤10 000. In the course of the crosslinking of the polyether carbonates containing alkoxysilyl groups used in accordance with the invention, the provision of a defined number of crosslinking opportunities within the above-specified range has been found to be particularly advantageous. This may lead to an optimal number of crosslinking points in the course of a crosslinking reaction conducted later. In this way it is possible to obtain particularly stable crosslinked polyether carbonate polymers. The average number of alkoxysilyl groups per molecule of the polyether carbonate containing alkoxysilyl groups produced may, furthermore, preferably be $\geq 2$ and $\leq 1000$ and most preferably $\geq 5$ and $\leq 100$.

In a further configuration of the process of the invention, the polyether carbonates containing alkoxysilyl groups produced can be crosslinked by addition of water and/or by addition of di- or polyisocyanates. The crosslinking need not be effected within the same reactor as the production of the polyether carbonate containing alkoxysilyl groups. Moreover, it is not necessary for the crosslinking to directly follow the production of the polyether carbonate containing alkoxysilyl groups. By contrast, it is preferably possible that the polyether carbonate containing alkoxysilyl groups is isolated and optionally dispensed, and the crosslinking is executed at a later juncture. The moisture curing of the inventive polyether carbonates containing alkoxysilyl groups is effected under the influence of water, which can be introduced into the system via air humidity particularly in the case of thin layers. In the case of thicker layers, water can also be introduced as such into the system. The curing temperature of the polyether carbonate containing alkoxysilyl groups may be $\geq 0$ to $\leq 140°$ C., preferably $\geq 20$ to $\leq 60°$ C. In addition, specifically in the case of relatively thick layers, the moisture curing can be catalyzed. Suitable catalysts for moisture curing are specified in DE 102009042201 A1. Particularly preferred catalysts in moisture curing are tin compounds, strong organic bases (amidines, guanidines, phosphorus imines, proazaphosphatranes) or strong acids such as toluenesulfonic acid or dodecylbenzenesulfonic acid. The catalysts can be used in amounts of 10 to 50 000 ppm, preferably of 100-20 000 ppm, based on the overall composition.

A further means of curing the polyether carbonates containing alkoxysilyl groups may arise from the addition of di- or polyisocyanates. In this case, the di- or polyisocyanates can react with the OH groups or the alkoxysilyl groups of the functionalized polyether carbonate. It is possible to use the isocyanate compounds from polyurethane chemistry that are known to the person skilled in the art.

In a further configuration of the process of the invention, it is additionally possible to add emulsifiers in the course of crosslinking. Specifically in the case of moisture during, it is possible to add external emulsifiers to the polyether carbonate containing alkoxysilyl groups, in order to improve the compatibility of the water with the organic matrix. Suitable emulsifiers are known to the person skilled in the art as emulsifiers or wetting agents. In a preferred embodiment, the polyether carbonate itself may function as emulsifier. For this purpose, it is possible with preference to use polyether carbonates having further hydrophilic groups in the polymer chain. This can be achieved by starting the polyether carbonate, for example, from a hydrophilic starter, for example polyethylene glycol. It is likewise possible for a random or blockwise incorporation of ethylene oxide, methyl glycidyl ether or methoxyethyl glycidyl ether to achieve hydrophilic functionalization of the polyether carbonate to such an extent that incorporation of water by emulsification is facilitated.

The invention further provides polyether carbonates containing alkoxysilyl groups, obtainable by the process of the invention. The polyether carbonates containing alkoxysilyl groups that are obtainable by the process of the invention are chemically stable and have preferred functionalities within the scope of possible additional process steps, for example a further crosslinking reaction. In addition, compared to the prior art cited polymers, there is generally increased OH functionality of the polymers of the invention, since the reaction with alkoxysilane compounds of the formula (II) can be conducted at lower temperatures. This reduces the risk of reaction of the OH end groups of the OH-functional starter compound or of the polymer with the alkyl-O—Si or aryl-O—Si units under transetherification. Furthermore, polymers having a more defined molecular weight distribution are obtained, since crosslinking of the alkoxysilyl groups during the formation of the polymer is ruled out.

The invention further provides crosslinked siloxane-functional polyether carbonate polymers obtainable by the process of the invention. The crosslinked siloxane-functional polyether carbonate polymers are notable for reproducible mechanical properties and a controllable reaction regime, since the reactants have a narrow and defined molecular weight distribution. This is possible since the functionalization with alkoxysilyl groups is not effected until a downstream process step and hence crosslinking of the polyether carbonate chains in the course of the polymer synthesis is avoided. Moreover, a higher strength of the polymer networks can be obtained compared to silane-functional polyether carbonate polyols used in the prior art in the reaction with di- or polyisocyanates, since the OH groups of the functionalized polyether carbonate are more reliably protected from side reactions.

The polyether carbonates having alkoxysilyl groups obtainable by the process presented can find use as adhesion promoters and/or filler-activators. Specifically the inventive combination of the different functional side groups in the polymer, on account of the combination of hydrophilic and hydrophobic properties, can lead to particularly good suitability for binding of interfaces of different polarity to one another. Accordingly, the polyether carbonates having alkoxysilyl groups preparable in accordance with the invention have particularly good usability in the cases where adhesion between interfaces of different polarity is desired. It is likewise possible through the use of the polyether carbonates containing alkoxysilyl groups of the invention to achieve better dispersion of fillers. Examples of fillers which can be activated by polyether carbonates having alkoxysilyl groups are oxidic or silicatic fillers, such as silica or alumina nanoparticles, finely divided silicas, synthetic or natural silicates. Finely divided silicas can be produced, for example, by precipitation of solutions of silicates or flame hydrolysis of silicon halides having specific surface areas of 5 to 1000 $m^2$/g, preferably 20 to 400 $m^2$/g (BET surface area) and having primary particle sizes of 10 to 400 nm. The silica may optionally also take the form of mixed oxides with other metal oxides such as aluminum oxides, magnesium oxides, calcium oxides, barium oxide, zinc oxides, zirconium oxide, titanium oxides. In addition, it is possible to use synthetic silicates such as aluminum silicate, alkaline earth metal silicates such as magnesium silicate and/or calcium silicate, having BET surface areas of 20 to 400 $m^2$/g and primary particle diameters of 10 to 400 nm. In addition, it is possible to use natural silicates such as kaolin and other naturally occurring silicas, metal hydroxides such as aluminum hydroxide and magnesium hydroxide. Without being bound by theory, this results from the chemical reaction of the alkoxysilyl groups of the polyether carbonates of the invention with the OH groups on the surface of the fillers. Such an activation of the fillers can contribute to a more rapid reaction regime and a more homogeneous product in the subsequent use.

The crosslinked siloxane-functional polyether carbonate polymers obtainable by the process presented can be used as a coating, foam, sealing compound, thermoplastic polymer, thermoset polymer, elastomer. This use of the crosslinked siloxane-functional polyether carbonate polymers may be particularly advantageous since the crosslinking reactions can proceed in a more controlled and uniform manner than with the siloxane-functional compounds described in the prior art. This is probably the result of better protection of the OH functionalities in the course of the polymer synthesis and a more homogeneous molecular mass distribution of the polyether carbonates containing alkoxysilyl groups, which can be achieved by a lower temperature in the functionalization.

The invention further provides a shaped body having a layer comprising a crosslinked siloxane-functional polyether carbonate polymer prepared by the process of the invention. The crosslinked siloxane-functional polyether carbonate polymers prepared in accordance with the invention may be particularly suitable for construction of mechanically stable layers on shaped bodies, since the polyether carbonates of the invention can be placed simply and reproducibly on shaped bodies, and a crosslinking reaction, for example, can be conducted solely via the ingress of air humidity.

With regard to further advantages and features of the above-described shaped body, reference is hereby made explicitly to the elucidations in connection with the crosslinked siloxane-functional polyether carbonate polymers of the invention, with the polyether carbonates containing alkoxysilyl groups and with the process of the invention. Inventive features and advantages of the polyether carbonates containing alkoxysilyl groups of the invention are also intended to be applicable to the process of the invention and to the crosslinked siloxane-functional polyether carbonate polymers of the invention and are considered to be disclosed as such, and vice versa. The invention also encompasses all combinations of at least two features disclosed in the description and/or in the claims.

EXAMPLES

Substances:
H-functional starter compound (starter) used:
PET-1 difunctional poly(oxypropylene)polyol having an OH number of 112 $mg_{KOH}/g$
Alkylene oxide bearing no double bonds used:
PO propylene oxide
GPTMS (3-glycidyloxypropyl)trimethoxysilane
Comonomer used:
AGE allyl glycidyl ether, containing electron-rich double bonds
Alkoxysilane compounds of the formula (II) used:
MPTS (3-mercaptopropyl)trimethoxysilane
TES triethoxysilane
Reagent for Introducing the Protecting Group
AA acetic anhydride
Free-radical initiator used:
Irgacure 819 bis(2,4,6-trimethylbenzoyl)phenylphosphine oxide
Catalysts used:
DMC catalyst prepared according to example 6 of WO-A 01/80994

Karstedt catalyst platinum(0)-1,3-divinyl-1,1,3,3-tetramethyldisiloxane, 0.05 M solution in xylene, platinum content 2 wt %, Sigma-Aldrich Methods:
OH Number (Hydroxyl Number)
The OH number (hydroxyl number) was determined on the basis of DIN 53240-2, except using N-methylpyrrolidone rather than THF/dichloromethane as the solvent. Titration took place with 0.5 molar ethanolic KOH solution, with endpoint recognition by means of potentiometry. The test substance used was certified castor oil. The statement of unit in "$mg_{KOH}/g$" relates to mg[KOH]/g[polyether carbonate].

Gel Permeation Chromatography
The number-average $M_n$ and the weight-average $M_w$ molecular weights of the resultant polyether carbonates were determined by means of gel permeation chromatography (GPC). The procedure was according to DIN 55672-1: "Gel permeation chromatography, Part 1—Tetrahydrofuran as eluent" (SECurity GPC System from PSS Polymer Service, flow rate 1.0 ml/min; columns: 2×PSS SDV linear M, 8×300 mm, 5 μm; RID detector). Polystyrene samples of known molar mass were used for calibration. The polydispersity was calculated as the ratio $M_w/M_n$.

Rheology
The viscosity of the product mixture was determined using a Physica MCR 501 rheometer from Anton Paar at 30° C., using a sphere/plate configuration with a sphere diameter of 25 mm and with a distance of 0.05 mm between sphere and plate. The shear rate was increased over 10 minutes from 0.01 to 1000 l/s. A value was taken every 10 seconds. The result reported is the viscosity as the average of the total of 60 measurement values.

For the rheological determination of the gel point, the polyether carbonates were admixed with water (10 wt %) and dibutyltin laurate (1 wt %). The complex moduli G' (storage modulus) and G" (loss modulus) were determined in an oscillation measurement at 25° C. and a frequency of 1 Hz, using a plate/plate configuration with a plate diameter of 15 mm, a plate-to-plate distance of 1 mm, and a 10 percent deformation. The gel point was defined as the juncture when the storage modulus and loss modulus were equal.

$^1$H NMR Spectroscopy
The sample was dissolved in deuterated chloroform and measured on a Bruker spectrometer (AV400, 400 MHz).

Preparation of the Unsaturated Polyether Carbonates:
The polymerization reactions were conducted in a 300 ml Parr pressure reactor. The pressure reactor used in the examples had a height (internal) of 10.16 cm and an internal diameter of 6.35 cm. The reactor was equipped with an electrical heating jacket (maximum heating power 510 watts). The counter-cooling consisted in an immersed tube of external diameter 6 mm which had been bent into a U shape and which projected into the reactor up to 5 mm above the base, and through which cooling water flowed at about 10° C. The water flow was switched on and off by means of a magnetic valve. In addition, the reactor was equipped with an inlet tube and a thermal sensor of diameter 1.6 mm, which both projected into the reactor up to 3 mm above the base.

The heating power of the electrical heating jacket during the activation [first activation stage] averaged about 20% of the maximum heating power. As a result of the regulation, the heating power varied by ±5% of the maximum heating power. The occurrence of increased evolution of heat in the reactor, brought about by the rapid reaction of propylene oxide during the activation of the catalyst [second activation stage], was observed via reduced heating power of the heating jacket, engagement of the counter-cooling, and, optionally, a temperature increase in the reactor. The occurrence of evolution of heat in the reactor, brought about by the continuous reaction of propylene oxide during the reaction [polymerization stage], led to a fall in the power of the heating jacket to about 8% of the maximum heating power. As a result of the regulation, the heating power varied by ±5% of the maximum heating power.

The hollow-shaft stirrer used in the examples was a hollow-shaft stirrer in which the gas was introduced into the reaction mixture via a hollow shaft in the stirrer. The stirrer body mounted on the hollow shaft had four arms and had a diameter of 35 mm and a height of 14 mm. At each end of the arm were mounted two gas outlets which had a diameter of 3 mm. The rotation of the stirrer gave rise to a reduced pressure such that the gas present above the reaction mixture ($CO_2$ and possibly alkylene oxide) was drawn off and introduced through the hollow shaft of the stirrer into the reaction mixture.

a) The terpolymerization of propylene oxide, unsaturated epoxides or cyclic anhydrides and $CO_2$ results not only in the cyclic propylene carbonate but also in the double bond-containing polyether carbonate comprising on the one hand polycarbonate units shown in formula (VIII)

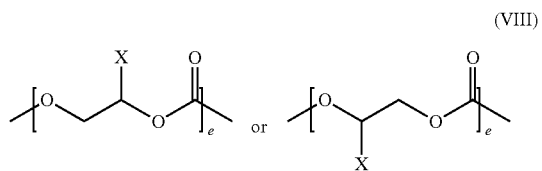
(VIII)

and on the other hand polyether units shown in formula (X)

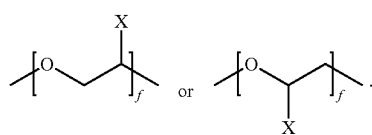
(X)

In this formula, X is either methyl or a side chain originating from the reaction of the unsaturated epoxide. In the case of use of cyclic anhydrides as comonomer, the terpolymer additionally contains ester groups.

The proportion of the unconverted monomers (propylene oxide $R_{PO}$, allyl glycidyl ether $P_{double\ bond}$ in mol %) was determined by means of $^1H$ NMR spectroscopy. For this purpose, a sample of each reaction mixture obtained after the reaction was dissolved in deuterated chloroform and measured on a Bruker spectrometer (AV400, 400 MHz).

Subsequently, the reaction mixture was diluted with dichloromethane (20 mL) and the solution was passed through a falling-film evaporator. The solution (0.1 kg in 3 h) ran downwards along the inner wall of a tube of diameter 70 mm and length 200 mm which had been heated externally to 120° C., in the course of which the reaction mixture was distributed homogeneously as a thin film on the inner wall of the falling-film evaporator in each case by three rollers of diameter 10 mm rotating at a speed of 250 rpm. Within the tube, a pump was used to set a pressure of 3 mbar. The reaction mixture which had been purified to free it of volatile constituents (unconverted epoxides, cyclic carbonate, solvent) was collected in a receiver at the lower end of the heated tube.

The molar ratio of carbonate groups to ether groups in the polyether carbonate (ratio e/f) and also the molar fraction of allyl glycidyl ether and MPTS incorporated into the polymer were determined by means of $^1H$ NMR spectroscopy. For this purpose, a sample of each purified reaction mixture was dissolved in deuterated chloroform and measured on a Bruker spectrometer (AV400, 400 MHz).

The relevant resonances in the $^1H$ NMR spectrum (based on TMS=0 ppm) which were used for integration are as follows:

| Signal | Shift in ppm | Designation | Area corresponds to number of H atoms |
|---|---|---|---|
| I1 | 1.10-1.17 | $CH_3$ group of the polyether units | 3 |
| I2 | 1.25-1.34 | $CH_3$ group of the polycarbonate units | 3 |
| I3 | 1.45-1.48 | $CH_3$ group of the cyclic carbonate | 3 |
| I4 | 2.95-3.00 | CH groups of the free propylene oxide not consumed by reaction | 1 |
| I5 | 5.83-5.94 | CH group of the double bonds obtained via the incorporation of allyl glycidyl ether into the polymer | 1 |
| I6 | 1.95-2.05 | $CH_3$ group of the acetyl end groups | 6 |
| I7 | 1.57-1.66 | $CH_2$ group of the MPTS incorporated into the polymer | 2 |
| I8 | 0.67-0.70 | $CH_2$ group of the GPTMS incorporated into the polymer | 2 |

Molar ratio of carbonate groups to ether groups in the polyether carbonate (e/f):

$$e/f = I2/I1$$

The proportion of carbonate units in the repeat units of the polyether carbonate:

$$P_{carbonate} = [(I2/3)/((I1/3)+(I2/3)+(I5)+(I6/6)))] \times 100\%$$

The proportion of the double bonds resulting from the incorporation of allyl glycidyl ether in the repeat units of the polyether carbonate:

$$P_{double\ bond} = [(I5)/((I1/3)+(I2/3)+(I5)+(I6/6)))] \times 100\%$$

The proportion of the AA end groups of the polyether carbonate:

$$P_{AA} = [(I6/6)/((I1/3)+(I2/3)+(I5)+(I6/6)))] \times 100\%$$

The proportion of the MPTS groups in the repeat units of the polyether carbonate:

$$P_{MPTS} = [(I7/2)/((I1/3)\pm(I2/3)+(I5)+(I6/6)+(I7/2)))] \times 100\%$$

The proportion of the double bonds remaining in the repeat units of the polyether carbonate after functionalization with alkoxysilyl groups:

$$'P_{double\ bond} = [(I5)/(I1/3)+(I2/3)+(I5)+(I6/6)+(I7/2)))] \times 100\%$$

The proportion of the GPTMS groups in the repeat units of the polyether carbonate:

$$P_{GPTMS} = [(I8/2)/((I1/3)+(I2/3)+(I8/2)))] \times 100\%$$

The molar proportion of the unconverted propylene oxide ($R_{PO}$ in mol %) based on the sum total of the amount of propylene oxide used in the activation and the copolymerization, calculated by the formula:

$$R_{PO}=[I4/((I1/3)\pm(I2/3)\pm(I3/3)+I4+(I5)))]\times 100\%$$

Preparation of the Unsaturated Polyether Carbonates

Unsaturated Polyether Carbonate 1: Terpolymerization of a Mixture of Propylene Oxide, Allyl Glycidyl Ether (16.4 Mol %) and $CO_2$

[first activation stage] A 970 ml pressure reactor equipped with a sparging stirrer was initially charged with a mixture of DMC catalyst (104 mg) and PET-1 (130 g) and this initial charge was stirred at 130° C. for 30 minutes under a partial vacuum (50 mbar), while passing argon through the reaction mixture.

[second activation stage] Following injection of $CO_2$ to 15 bar, with observation of a slight drop in temperature, and following re-establishment of a temperature of 130° C., 13.0 g of a monomer mixture (30.0 wt % of allyl glycidyl ether [corresponding to 16.4 mol %] in solution in propylene oxide) were metered in by means of an HPLC pump (5 ml/min). The reaction mixture was stirred (800 rpm) at 130° C. for 20 min. The addition of 13.0 g of a monomer mixture was repeated a second and third time.

[polymerization stage] After cooling to 100° C., a further 203.0 g of the monomer mixture (30.0 wt % of allyl glycidyl ether [corresponding to 16.4 mol %] in solution in propylene oxide) were metered in using an HPLC pump (5 ml/min), while keeping the $CO_2$ pressure constant at 15 bar. The reaction mixture was subsequently stirred at 100° C. for a further 1 h. The reaction was halted by cooling of the reactor with ice-water. The resulting mixture was free from the propylene oxide and allyl glycidyl ether monomers used. The cPC was then removed under reduced pressure.

[acetylation] In a 250 ml two-neck flask, acetic anhydride (100 g, 0.6 mmol) and polyether carbonate (50 g) were combined. The reaction mixture was stirred at 80° C. for 4 hours. Subsequently, the volatile constituents were removed under reduced pressure.

| Selectivity | e/f | 0.17 |
|---|---|---|
| $P_{carbonate}$ in % | | 12.9 |
| $P_{double\ bond}$ in % | | 10.0 |
| Molecular weight in g/mol | $M_n$ | 4421 |
| Polydispersity | | 1.2 |

The molar proportion of allyl glycidyl ether groups based on all comonomer units (propylene oxide, allyl glycidyl ether, $CO_2$) of the polyether carbonate obtained was 10 mol %.

Preparation of the Polyether Carbonates Containing Alkoxysilyl Groups

Example 1: Preparation of a Polyether Carbonate Containing 2.6 Mol % (4.2 wt %) of Trimethoxysilyl Groups by Reaction with Mercapto-Functional Alkoxysilane Compound In a 50 ml Schlenk flask, the unsaturated polyether carbonate 1 (10.0 g) and (3-mercaptopropyl)trimethoxysilane (0.9 g, 4.6 mmol) were combined. Next, the Irgacure 819 photoinitiator (109 mg) was introduced into the reaction mixture. The overall reaction mixture was irradiated with UV light (22 W/cm$^2$) while stirring for two minutes. Subsequently, the product prepared was analyzed by means of NMR spectroscopy and GPC chromatography.

| $P_{MPTS}$ in % | | 2.7 |
|---|---|---|
| $'P_{double\ bond}$ in % | | 6.2 |
| Molecular weight in g/mol | $M_n$ | 5052 |
| Polydispersity | | 1.7 |

Analysis of the GPC chromatogram showed a monomodal molecular weight distribution with a maximum at 4290 g/mol. This demonstrates that only insignificant cross-linking, if any, of the polyether carbonate chains has taken place.

Observation of the storage stability showed that, after the reaction, a low-viscosity product that remained unchanged over the course of 72 hours was obtained.

Example 2: Preparation of a Polyether Carbonate Containing 5.7 Mol % (7.8 wt %) of Trimethoxysilyl Groups by Reaction with Mercapto-Functional Alkoxysilane Compound In a 50 ml Schlenk flask, the unsaturated polyether carbonate 1 (10.0 g) and (3-mercaptopropyl)trimethoxysilane (1.8 g, 9.2 mmol) were combined. Next, the Irgacure 819 photoinitiator (118 mg) was introduced into the reaction mixture. The overall reaction mixture was irradiated with UV light (22 W/cm$^2$) for two minutes. Subsequently, the product prepared was analyzed by means of NMR spectroscopy and GPC chromatography.

| $P_{MPTS}$ in % | | 5.7 |
|---|---|---|
| $'P_{double\ bond}$ in % | | 3.3 |
| Molecular weight in g/mol | $M_n$ | 5561 |
| Polydispersity | | 1.7 |

Analysis of the GPC chromatogram showed a monomodal molecular weight distribution with a maximum at 4600 g/mol. This demonstrates that only insignificant cross-linking, if any, of the polyether carbonate chains has taken place.

Observation of the storage stability showed that, after the reaction, a low-viscosity product that remained unchanged over the course of 72 hours was obtained.

Example 3: Preparation of a Polyether Carbonate Containing 8.0 Mol % (10.8 wt %) of Trimethoxysilyl Groups by Reaction with Mercapto-Functional Alkoxysilane Compound In a 50 ml Schlenk flask, the unsaturated polyether carbonate 1 (10.0 g) and (3-mercaptopropyl)trimethoxysilane (2.7 g, 13.9 mol) were combined. Next, the Irgacure 819 photoinitiator (29 mg) was introduced into the reaction mixture. The overall reaction mixture was irradiated with UV light (22 W/cm$^2$) for two minutes. Subsequently, the product prepared was analyzed by means of NMR spectroscopy and GPC chromatography.

| $P_{MPTS}$ in % | | 8.0 |
|---|---|---|
| $'P_{double\ bond}$ in % | | 1.0 |
| Molecular weight in g/mol | $M_n$ | 5822 |
| Polydispersity | | 1.8 |

Analysis of the GPC chromatogram showed a monomodal molecular weight distribution with a maximum at 4800 g/mol. This demonstrates that only insignificant cross-linking, if any, of the polyether carbonate chains has taken place.

Observation of the storage stability showed that, after the reaction, a low-viscosity product that remained unchanged over the course of 72 hours was obtained.

Example 4: Preparation of a Polyether Carbonate Containing 9.0 Mol % (3.6 wt %) of Triethoxysilyl Groups by Reaction with Hydrido-Functional Alkoxysilane Compound A 100 ml two-neck flask was initially charged with the unsaturated polyether carbonate 1 (10 g) and triethoxysilane (5 g), and the mixture was heated to 80° C. under argon. Subsequently, the Karstedt catalyst (500 µl, 0.05 M) was added to the reaction mixture. The reaction mixture was stirred for one hour. Subsequently, the volatile constituents were removed under reduced pressure. The product prepared was analyzed by means of NMR spectroscopy and GPC chromatography.

| | | |
|---|---|---|
| $P_{TES}$ in % | | 9 |
| $'P_{double\ bond}$ in % | | 1 |
| Molecular weight in g/mol | $M_n$ | 5930 |
| Polydispersity | | 2.7 |

Analysis of the GPC chromatogram showed a monomodal molecular weight distribution. This demonstrates that only insignificant crosslinking, if any, of the polyether carbonate chains has taken place.

Observation of the storage stability showed that, after the reaction, a low-viscosity product that remained unchanged over the course of 72 hours was obtained.

Preparation of Crosslinked Siloxane-Functional Polyether Carbonate Polymers by Reaction of the Polyether Carbonates Containing Alkoxysilyl Groups of the Invention with Water

Example 5: Curing of a Mixture of Polyether Carbonate Containing Alkoxysilyl Groups (Example 1) and Water In an aluminum dish, 1.0 g of the polyether carbonate from example 1 was mixed with water (0.1 g) and dibutyltin dilaurate (20 mg). Subsequently, 0.4 g of the mixture was analyzed with the rheometer. The gel point occurred after 23.5 min.

Example 6: Curing of a Mixture of Polyether Carbonate Containing Alkoxysilyl Groups (Example 2) and Water In an aluminum dish, 1.0 g of the polyether carbonate from example 2 was mixed with water (0.1 g) and dibutyltin dilaurate (20 mg). Subsequently, 0.4 g of the mixture was analyzed with the rheometer. The gel point occurred after 9.5 min.

Example 7: Curing of a Mixture of Polyether Carbonate Containing Alkoxysilyl Groups (Example 3) and Water In an aluminum dish, 1.0 g of the polyether carbonate from example 3 was mixed with water (0.1 g) and dibutyltin dilaurate (20 mg). Subsequently, 0.4 g of the mixture was analyzed with the rheometer. The gel point occurred after <1 min.

Example 8: Curing of a Mixture of Polyether Carbonate Containing Alkoxysilyl Groups (Example 4) and Water In an aluminum dish, 1.0 g of the polyether carbonate from example 4 was mixed with water (0.1 g) and dibutyltin dilaurate (20 mg). Subsequently, 0.4 g of the mixture was analyzed with the rheometer. The gel point occurred after 45.0 min.

Example 9 (Comp.): Curing of a Mixture of a Polyether Carbonate Lacking Alkoxysilyl Groups and Water In an aluminum dish, 1.0 g of the unsaturated polyether carbonate 1 was mixed with water (0.1 g) and dibutyltin dilaurate (20 mg). Subsequently, 0.4 g of the mixture was analyzed with the rheometer. No gel point was observed.

TABLE 1

Comparison of the results from examples 5 to 8

| Example | Monomer for introduction of the alkoxysilyl group | Proportion of alkoxysilyl groups in the polyether carbonates in mol % | Time taken to attain the gel point, in minutes |
|---|---|---|---|
| 5 | MPTS | 2.6 | 23.5 |
| 6 | MPTS | 5.7 | 9.5 |
| 7 | MPTS | 8.0 | <1 |
| 8 | TES | 9.0 | 45.0 |
| 9 (comp.) | — | 0 | no curing | comp.: comparative example

Examples 5 to 7 demonstrate that polyether carbonates containing alkoxysilyl groups prepared by reaction of an unsaturated polyether carbonate with a mercapto-functional alkoxysilane compound (MPTS) cure in the presence of water. Example 8 demonstrates that polyether carbonates containing alkoxysilyl groups prepared by reaction of an unsaturated polyether carbonate with a hydrido-functional alkoxysilane compound (TES) cure in the presence of water.

A comparison of examples 5 to 8 with comparative example 9 shows that polyether carbonates containing alkoxysilyl groups cure in the presence of water, whereas the polyether carbonate without incorporation of alkoxysilyl groups does not cure. With a rising proportion of alkoxysilyl groups in the polyether carbonate, there is a fall in the time taken to attain the gel point from 23.5 min (example 5) to <1 min (example 7).

Preparation of Crosslinked Siloxane-Functional Polyether Carbonate Polymers by Reaction of the Polyether Carbonates Containing Alkoxysilyl Groups of the Invention with Silica Gel

Example 10: Curing of a Mixture of Polyether Carbonate Containing Alkoxysilyl Groups (Example 1) and Silica Gel In an aluminum dish, 1.5 g of the polyether carbonate from example 1 was mixed with silica gel (60 mesh, 75 mg) and dibutyltin dilaurate (30 mg). Subsequently, 0.4 g of the mixture was analyzed with the rheometer. The gel point occurred after 60 min.

Example 11: Curing of a Mixture of Polyether Carbonate Containing Alkoxysilyl Groups (Example 2) and Silica Gel In an aluminum dish, 1.5 g of the polyether carbonate from example 2 was mixed with silica gel (60 mesh, 75 mg) and dibutyltin dilaurate (30 mg). Subsequently, 0.4 g of the mixture was analyzed with the rheometer. The gel point occurred after 20 min.

Example 12: Curing of a Mixture of Polyether Carbonate Containing Alkoxysilyl Groups (Example 4) and Silica Gel (60 Mesh)

In an aluminum dish, 1.5 g of the polyether carbonate from example 4 was mixed with silica gel (75 mg) and dibutyltin dilaurate (30 mg). Subsequently, 0.4 g of the mixture was analyzed with the rheometer. The gel point occurred after 52 min.

Example 13 (Comp.): Curing of a Mixture of a Polyether Carbonate Lacking Alkoxysilyl Groups and Silica Gel In an aluminum dish, 1.5 g of the unsaturated polyether carbonate 1 was mixed with silica gel (60 mesh, 75 mg) and dibutyltin dilaurate (30 mg). Subsequently, 0.4 g of the mixture was analyzed with the rheometer. No gel point was observed.

TABLE 2

Comparison of the results from examples 10 to 13

| Example | Monomer for introduction of the alkoxysilyl group | Proportion of alkoxysilyl groups in the polyether carbonate in mol % | Time taken to attain the gel point, in minutes |
|---|---|---|---|
| 10 | MPTS | 2.6 | 60 |
| 11 | MPTS | 5.7 | 20 |
| 12 | TES | 9 | 52 |
| 13 (comp.) | — | 0 | no curing | comp.: comparative example

Examples 10 to 11 demonstrate that polyether carbonates containing alkoxysilyl groups prepared by reaction of an unsaturated polyether carbonate with a mercapto-functional alkoxysilane compound (MPTS) cure in the presence of silica gel. Example 12 demonstrates that polyether carbonates containing alkoxysilyl groups prepared by reaction of an unsaturated polyether carbonate with a hydrido-functional alkoxysilane compound (TES) cure in the presence of silica gel.

A comparison of examples 10 to 12 with comparative example 13 shows that polyether carbonates containing alkoxysilyl groups (examples 10 to 12) cure in the presence of silica gel, whereas the polyether carbonate lacking alkoxysilyl groups (comparative example 13) does not cure. With a rising proportion of alkoxysilyl groups in the polyether carbonate, there is a fall in the time taken to attain the gel point from 60 min (example 10) to <20 min (example 11).

Example 14 (Comp.): Terpolymerization of Propylene Oxide, (3-Glycidyloxypropyl)Trimethoxysilane and $CO_2$

[first activation stage] A 970 ml pressure reactor equipped with a sparging stirrer was initially charged with a mixture of DMC catalyst (78 mg) and PET-1 (130.0 g) and this initial charge was stirred at 130° C. for 30 minutes under a partial vacuum (50 mbar), while passing argon through the reaction mixture.

[second activation stage] After injection of $CO_2$ to 15 bar, in the course of which a slight drop in temperature was observed, and re-attainment of a temperature of 130° C., 13 g of propylene oxide were metered in with the aid of an HPLC pump (5 ml/min). The reaction mixture was stirred (800 rpm) at 130° C. for 20 min. The addition of 13.0 g of propylene oxide was repeated a second and third time.

[polymerization stage] After cooling to 100° C., a further 150.5 g of propylene oxide were metered in by means of an HPLC pump (5 ml/min). Simultaneously with commencement of the addition of propylene oxide in the polymerization stage, 70 g of (3-glycidyloxypropyl)trimethoxysilane were metered in by means of a separate HPLC pump (2.3 ml/min), while keeping the $CO_2$ pressure constant at 15 bar. The reaction mixture was subsequently stirred at 100° C. for a further 2 h. The reaction was halted by cooling of the reactor with ice-water. The resulting mixture was free from the propylene oxide and (3-glycidyloxypropyl)trimethoxysilane monomers used. The cPC was then removed under reduced pressure.

The product prepared was analyzed by means of NMR spectroscopy and GPC chromatography.

| Selectivity | e/f | 0.13 |
|---|---|---|
| $P_{carbonate}$ in % | | 0.08 |
| $P_{GPTMS}$ in % | | 4.29 |
| Molecular weight in g/mol | $M_n$ | 2922 |
| Polydispersity | | 1.39 |

Analysis of the GPC chromatogram showed a trimodal molecular weight distribution with maxima at 1800, 3600 and 6500 g/mol. This demonstrates that crosslinking of the polyether carbonate chains has taken place.

Observation of the storage stability showed that a viscous product was obtained after the reaction, which became a gel with slight crosslinking after 24 hours, a gel with significant crosslinking after 48 hours, and a solid after 72 hours.

Comparison

The storage stability of the sample obtained from comparative example 14 is compared in the table below with the storage stability of a sample of a polyether carbonate containing alkoxysilyl groups obtained by the process of the invention (examples 1 to 4).

TABLE 2

Comparison of the results from examples 2 and 14

| Example | State after reaction | State after 24 h | State after 48 h | State after 72 h |
|---|---|---|---|---|
| 1 | liquid | liquid | liquid | liquid |
| 2 | liquid | liquid | liquid | liquid |
| 3 | liquid | liquid | liquid | liquid |
| 4 | liquid | liquid | liquid | liquid |
| 14 (comp.) | viscous | gel with slight crosslinking | gel with significant crosslinking | solid | comp.: comparative example

A comparison of examples 1 to 4 with comparative example 14 demonstrates that polyether carbonates containing alkoxysilyl groups which have been obtained by reaction of an unsaturated polyether carbonate with a mercapto-functional alkoxysilane compound (MPTS) (inventive)

remain unchanged over 72 h (examples 1 to 4), whereas polyether carbonates containing alkoxysilyl groups which have been obtained by terpolymerization of propylene oxide, (3-glycidyloxypropyl)trimethoxysilane and $CO_2$ (reworking of EP 2 093 244 A1, comparative example 14) by reaction of unprotected OH groups and alkoxysilane groups form a network which leads first to gelation within 72 h, then to a solid.

The invention claimed is:

1. A process for preparing polyether carbonates containing alkoxysilyl groups or polyether carbonate polyols containing alkoxysilyl groups, comprising reacting
   (a) an unsaturated polyether carbonate polyol with
   (b) an alkoxysilane compound corresponding to the formula (II)

wherein:
   X represents H or Y—S—H
      wherein
      Y represents a $C_1$-$C_{22}$ alkylene group, a $C_6$-$C_{14}$ arylene group, a $C_7$-$C_{14}$ aralkylene group, or a $C_7$-$C_{14}$ alkylarylene group;
   R1 represents a $C_1$-$C_8$ alkoxy group, a $C_7$-$C_{20}$ aralkoxy group, a $C_6$-$C_{14}$ aroxy group, a $C_7$-$C_{20}$ alkylaroxy group;
   R2 represents a $C_1$-$C_{22}$ alkyl group, a $C_6$-$C_{14}$ aryl group, a $C_7$-$C_{14}$ aralkyl group, a $C_7$-$C_{14}$ alkylaryl group;
   m and n are independently an integer ≥ 1;
   o is zero or an integer ≥ 1; and
   m+n+o=4.

2. The process as claimed in claim 1, wherein the unsaturated polyether carbonate polyol is obtainable by a process comprising
   (α) initially charging an H-functional starter compound and a catalyst; then
   (γ) metering in carbon dioxide, at least one alkylene oxide and at least one unsaturated comonomer comprising at least one of unsaturated alkylene oxides and unsaturated cyclic anhydrides of organic acids.

3. The process as claimed in claim 2, wherein said catalyst comprises a double metal cyanide catalyst.

4. The process as claimed in claim 2, wherein the proportion of unsaturated comonomers in the preparation of the unsaturated polyether carbonate polyol is 0.1 to 50 mol % based on the total molar amount of carbon dioxide, alkylene oxide and comonomers.

5. The process as claimed in claim 1, wherein m=1.

6. The process as claimed in claim 1, additionally comprising a compound selected from the group consisting of photoinitiators, peroxides, azo compounds, metal-activated peroxides, redox initiators and mixtures thereof.

7. The process as claimed in claim 1, additionally comprising a hydrosilylation catalyst selected from the group consisting of the Karstedt or Speier catalysts, elemental platinum, elemental platinum on a support composed of activated carbon or alumina, or mixtures thereof.

8. The process as claimed in claim 1 additionally comprising reacting the OH groups of the unsaturated polyether carbonate polyol with a protecting reagent to introduce protecting groups, prior to the reaction of the unsaturated polyether carbonate polyol with the alkoxysilane compound of the formula (II), wherein said protecting reagent is selected from the group comprising trimethyloxonium tetrafluoroborate, methyl mesylate, methyl tosylate, dimethyl sulfate, methyl triflate, diazomethane, acetic anhydride, chloroacetyl anhydride, trifluoroacetyl anhydride, N,O-bis (trimethylsilyl) acetamide, hexamethyldisilazane in an equimolar mixture with chlorotrimethylsilane or with chlorotrimethylsilane in a molar excess, chlorotrimethylsilane, trimethylsilyl triflate, trityl chloride, o-nitrobenzyl chloride, tosyl chloride, mesyl chloride, tetrahydropyran and isobutene, and, optionally, after the reaction of the unsaturated polyether carbonate polyol with the alkoxysilane compound of the formula (II), removing part or all of the protecting group to obtain a polyether carbonate polyol containing alkoxysilyl groups.

9. The process as claimed in claim 1, comprising crosslinking a polyether carbonate containing alkoxysilyl groups; by adding water.

10. A crosslinked polymer containing siloxane groups, obtainable by a process as claimed in claim 9.

11. A coating composition, foam, sealing compound, thermoplastic polymer, thermoset polymer or elastomer which comprising silica fillers and the crosslinked polymer containing siloxane groups of claim 10.

12. A molded body comprising a crosslinked polymer containing siloxane groups as claimed in claim 10.

13. An adhesive or sealant composition comprising silica fillers and at least one of an adhesion promoter and/or a filler-activator wherein said adhesion promoter and/or said filler-activator comprises polyether carbonate containing alkoxysilyl groups or of a polyether carbonate polyol containing alkoxysilyl groups as claimed in claim 1.

14. The process as claimed in claim 1, comprising crosslinking a polyether carbonate polyol containing alkoxysilyl groups by adding water.

15. The process as claimed in claim 1, comprising crosslinking a mixture of polyether carbonate containing alkoxysilyl groups and polyether carbonate polyol containing alkoxysilyl groups by adding water.

* * * * *